United States Patent
Luft et al.

(10) Patent No.: US 8,259,659 B2
(45) Date of Patent: Sep. 4, 2012

(54) APPARATUS AND METHODS FOR MANAGING ACCESS AND UPDATE REQUESTS IN A WIRELESS NETWORK

(75) Inventors: Achim Luft, Braunschweig (DE); Maik Bienas, Braunschweig (DE)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 12/217,433

(22) Filed: Jul. 3, 2008

(65) Prior Publication Data

US 2010/0002582 A1   Jan. 7, 2010

(51) Int. Cl.
*H04W 4/00* (2009.01)
*H04J 3/17* (2006.01)

(52) U.S. Cl. ...... 370/329; 370/337; 370/434; 455/456.1

(58) Field of Classification Search .......... 370/229–232, 370/330, 335–337, 342–345, 347, 480, 498; 455/422.1, 432.1, 433, 435.1, 436, 440, 441, 455/456.1, 456.5, 456.6
See application file for complete search history.

(56) References Cited

U.S. PATENT DOCUMENTS

| | | | |
|---|---|---|---|
| 6,445,924 B1 * | 9/2002 | Rasanen | 455/453 |
| 6,490,452 B1 * | 12/2002 | Boscovic et al. | 455/452.1 |
| 6,556,820 B1 | 4/2003 | Le et al. | |
| 6,937,868 B2 | 8/2005 | Himmel et al. | |
| 6,968,190 B1 | 11/2005 | Suumaki et al. | |
| 6,968,196 B1 | 11/2005 | Back et al. | |
| 7,181,212 B2 | 2/2007 | Hogan et al. | |
| 7,299,019 B1 * | 11/2007 | Austin et al. | 455/453 |
| 7,333,795 B2 | 2/2008 | Dorsey et al. | |
| 7,333,811 B2 | 2/2008 | Liu | |
| 7,447,506 B1 * | 11/2008 | MacKenzie et al. | 455/453 |
| 2002/0019231 A1 * | 2/2002 | Palenius et al. | 455/453 |
| 2006/0133347 A1 | 6/2006 | Das | |
| 2007/0213057 A1 | 9/2007 | Shaheen | |
| 2010/0097958 A1 * | 4/2010 | Yi et al. | 370/254 |

FOREIGN PATENT DOCUMENTS

WO   WO 9930524   6/1999

* cited by examiner

*Primary Examiner* — Kerri Rose
(74) *Attorney, Agent, or Firm* — Gazdzinski & Associates, PC

(57) ABSTRACT

Methods and apparatus that enable a wireless network to detect and manage impending congestion events caused by a plurality of mobile devices attempting to access the network in a brief space of time. In one embodiment, the network comprises a 3g (UMTS) cellular network, and includes a congestion management and avoidance entity that preemptively triggers a collision mode upon detecting an impending congestion event. This mode advantageously reduces processing burden on the base station by causing the mobile devices (UEs) to halt current access attempts, and invoke a multiple access scheme (e.g., wait a random amount of time before attempting further access attempts). The comparatively early detection and avoidance of collisions reduces the mobile device's power consumption, while addressing congestion events early in the wireless communication process so as to maintain optimal network conditions.

17 Claims, 14 Drawing Sheets

| FAILURE CODE | CAUSE |
|---|---|
| # 2 | IMSI unknown in HLR |
| # 3 | Illegal MS |
| # 6 | Illegal ME |
| # 7 | GPRS services not allowed |
| # 8 | GPRS services and non GPRS services not allowed |
| # 9 | MS identity cannot be derived by the network |
| # 10 | implicitly detached |
| # 11 | PLMN not allowed |
| # 12 | Location area not allowed |
| # 13 | Roaming not allowed in this location area |
| # 14 | GPRS services not allowed in this PLMN |
| # 15 | No Suitable Cells in Location Area |
| # 16 | MSC temporarily not reachable |
| # 17 | Network failure |
| # 22 | Congestion |
| # 96 | Mandatory information element error |
| # 99 | Information element non-existent or not implemented |
| # 100 | Conditional IE error |
| # 111 | Protocol error, unspecified |

FIG. 4C (PRIOR ART)

APPARATUS AND METHODS FOR MANAGING ACCESS AND UPDATE REQUESTS IN A WIRELESS NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for managing a heavy influx of radio network access attempts (such as those generated by a plurality of self-managing user devices accessing a cellular network within a brief period of time), so as to manage the processing burden on the network.

2. Description of Related Technology

Modern wireless networks which are adapted to serve large geographic areas generally comprise a plurality of fixed transceivers (e.g., base stations) in order to communicate with the plurality of user devices (e.g., mobile telephones or computers). One such system is the well known cellular telephone system, which employs numerous individual and unique coverage areas or "cells" which collectively form a cohesive patchwork or network for coverage of the desired geographic area. Subsets of these cells, such as those in close geographic proximity to one another, or which have another common physical or logical relationship to one another, may be bundled together to form integrated entities for purposes of operation of the network. Common cellular systems in use today include those compliant with the 3G (e.g., UMTS) or GSM standards.

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology In the exemplary context of a UMTS system, a base station is commonly referred to as a "NodeB". The UMTS Terrestrial Radio Access Network (UTRAN) is the collective body of NodeBs along with the UMTS Radio Network Controllers (RNC). The user interfaces to the UTRAN via User Equipment (UE), which in many typical usage cases is a cellular phone or smartphone. FIG. 1 illustrates an exemplary UMTS cellular system 100. The UMTS system comprises a plurality of base station towers 102 (NodeBs) that are set at various fixed geographic locations. Each of these base station towers is characterized by their respective wireless coverage areas 104. Within UMTS, groupings of base stations are further divided into Location Areas 108 (LA) and Routing Areas 106 (RA) based on geographical proximity. The Core Network 110 generally governs the operation of the base stations, LAs, and RAs. Subscriber operated user equipment (UE) in the coverage area of one base station, may move to another base station coverage area, handling call setup and operation overhead transparent to the user.

Relay stations or repeaters (not shown) may be used in certain areas within the network, such as those with a high density of users (e.g., in train tunnels, etc.), in order to improve the signal coverage in such areas. Normally, such relay stations merely amplify the upstream or downstream radio signals. These relay stations are typically fixed, but may themselves also be mobile or at least portable (i.e., capable of migration and setup at different locations).

Within a UMTS network, one of the aforementioned "integrated entities" comprises an LA 108 (FIG. 1), which is defined as a wireless coverage range for a circuit-switched (CS) network, serviced by one or more base stations 102, in which a UE may move freely without updating its current location at the Visitor Location Register (VLR), a component to be described in greater detail below. When a UE moves outside its LA, it informs the VLR of its current location through a location update procedure. Each Location Area is uniquely identified across all Public Land Mobile Networks (PLMN) by the Location Area Identity (LAI) which comprises a Mobile Country Code (MCC), Mobile Network Code (MNC), and Location Area Code (LAC).

Similarly, an RA 106 is defined as a wireless coverage range for a packet-switched (PS) network, serviced by one or more base stations 102, in which an UE may move freely without updating its current location at the Serving GPRS (General Packet Radio Service) Support Node (SGSN). An RA is functionally similar to an LA, other than the differences related to CS/PS, and corresponding network structures (VLR, SGSN). An additional difference between RA and LA is that an RA is always contained within an LA. This dependency is reflected in the Routing Area Identity (functionally similar to the LAI), as the RAI a concatenation of the LAI with an addition of a Routing Area Code (RAC).

LA and RA tracking for UEs enable efficient Mobility Management (MM) within a UMTS cellular network. MM is necessary for the network to deliver calls, SMS and other mobile phone services. If the LA(s)/RA(s) are large, there will be many mobile devices operating simultaneously, resulting in very high paging traffic, as every paging request has to be broadcast to every base station 102 in the LA/RA. This wastes bandwidth and power on the UE, as the UE must listen for paging traffic constantly. If there are too many small LA(s)/RA(s), the UE must contact the network frequently to update location changes, which will also drain the UE's battery. Therefore, a balance must be struck between a larger LA/RA which increases network overhead during paging, and a smaller LA/RA which increases the frequency of LA/RA updates. The design tradeoff between paging area and frequency of paging also dictates the size disparity between LA and RA; although the "bursty", high data rate usage of PS data (handled with RAs) is more efficiently handled with a smaller paging area, CS data (handled with LAs) is more efficiently handled with larger area.

As previously mentioned, the UE must inform the cellular network whenever it moves from one location area to the next. The location area update procedure (which is functionally similar to the routing area update procedure) allows a UE to inform the Core Network 110, whenever it moves from one location area to another, so that the Core Network may page the UE in its new area. Mobiles are responsible for detecting the broadcast LAC/RAC. When a mobile finds that the LAC/RAC is different from its last update, it notifies the network with a message comprising an update request, with its previous location, and it's Temporary Mobile Subscriber Identity (TMSI), or in some cases its International Mobile Subscriber Identity (IMSI) which is a unique network identifier.

FIG. 1A, illustrates the foregoing issues by way of an exemplary platform (passenger train 150) with a large UE 152 spatial density (e.g. 3000-4500 people) crossing an LA/RA boundary. As the train crosses the LA/RA boundary, each unconnected UE (a UE not already maintaining a data connection to the network) initiates a LA/RA update.

Initiating a Radio Link, RACH/AICH Operation

FIG. 2 shows the processing of PRACH preambles 200 of the establishment of a radio link. As depicted, the UEs 152 are transmitting on a Physical Random Access Channel (PRACH) 252. The NodeB is transmitting on the physical Acquisition Indication Channel (AICH) 254.

FIG. 2A illustrates the format of the Random Access Channel (RACH), which is a transport channel mapped onto the Physical Random Access Channel (PRACH) 252. The RACH encapsulates, inter alia, the Common Control Channel (CCCH). The CCCH may include requests to set up radio resource control (RRC) connections, and dedicated control information. The RACH may also be used for sending some dedicated user information, and small amounts of uplink packet data. As shown in FIG. 2A the PRACH uplink signal may be formatted into data 210 or control 212 (preambles are not shown, as they contain no messaging information) accesses. Each PRACH has 15 time slots 214 (2560 chips in length). A radio frame 216 is 15 time slots.

FIG. 2B further illustrates the random access transmission 218 capability of the RACH. The RACH has 15 access slots 220. Each access slot consists of two 10 ms time slots 214. Per two 10 ms radio frames 216 (20 ms), there are 15 possible RACH access slots.

FIG. 2C illustrates the format of the AICH 254, which is a common control channel broadcasted by the NodeB 102. The AICH carries an acquisition indication that is 32 symbols in length 222, corresponding to a received PRACH 252 preamble. The AICH is dedicated for transmission of acquisition indications, and does not have any other messaging format. As with the PRACH, the AICH has 15 access slots 220 per two radio frames (20 ms).

The AICH 254 and PRACH 252 channels as shown in FIG. 2A and FIG. 2B have only 15 separate access slots within a 20 ms window. Furthermore, the timing of AICH responses to PRACH preambles is fixed. Therefore, a limited number of preambles and corresponding RACH accesses may be served in any particular time interval.

Referring back to FIG. 2, exemplary PRACH 252 and AICH 254 traffic is illustrated. Initially, a UE (UE#A 152A) must determine system timing of the NodeB 102 by demodulating broadcast control channel information. UE#A calculates the initial RACH transmission power based on the Common Pilot Channel (CPICH) signal strength of the new cell. UE#A chooses a time slot 214 out of a set of available time slots, and a signature out of a set of 16 available orthogonal signatures. UE#A sends at the chosen time slot a fixed preamble coded with the chosen signature 202A. The initial power is calculated as described above, and expected to be too low to be received by the base station. When UE#A does not receive a AICH response, UE#A increases transmit power of the preamble. The preamble is escalated until either the NodeB signals on the AICH, or the UE reaches its maximum allowed preamble transmit power.

Once the NodeB 102 receives a preamble 202A correctly, the NodeB can determine UE#A's 152A uplink propagation delay, and aligns its AICH 254 accordingly. The acquisition indication (or ACK) 204A is transmitted with the received signature on the AICH.

UE#A 152A receives and demodulates the AICH 254, thereafter, and then verifies that the ACK 204A encapsulates the expected signature. If UE#A determines that the AICH was correctly received, it corrects for NodeB propagation delay, and sets its own transmit power at the corresponding preamble transmit power. UE#A transmits corresponding RRC connection request on the RACH 206A using corrected transmit power, and timing.

Due to the high possibility of contention over the PRACH 252, the NodeB 102 may signal a NACK 208BC. This is illustrated when a second UE (UE#B 152B) and third UE (UE#C 152C) transmit preambles 202B, and 202C respectively. The NodeB receives both preambles, and determines that a collision has occurred. The NodeB signals a NACK 208BC. UE#B and UE#C both desist from further preamble transmission, and back off for a randomized period of time. At a later point, UE#B initiates a preamble access 202D, and is acknowledged correctly by the NodeB with a corresponding ACK 204D. Once a previously idle UE has established a radio link, the UE may proceed with the RA update.

Location Area/Routing Area Entities

FIG. 3 is a simplified system diagram illustrating the entities involved in a typical LA/RA update process. LA and RA update processes are fundamentally similar (with some exceptions due to CS/PS, as previously explained).

The Core Network 110 (see FIG. 1) consists of a CS domain, and a PS domain. Each domain has corresponding entities which perform similar functions and are simultaneously connected to the same UE, but which remain distinct from one another. The Core Network CS domain is comprised of Mobile Switching Centers (MSCs) and Visitor Location Registers (VLRs). The PS domain is comprised of Serving GPRS Support Nodes (SGSNs) 306 and Gateway GPRS Support Nodes (GGSNs) 310. The MSC/VLRs 304 manages CS data (e.g. voice calls, SMS, etc.), SGSNs manages PS data (e.g. IMS access, etc.), each within their respective geographic locations.

Access, and authorization control is governed primarily by the Home Location Register/Authentication Center (HLR/AuC) 302, which acts a central database that can uniquely identify and verify each subscriber that is authorized to use the Core Network. Once a UE has authenticated itself with the HLR/AuC, the UE's identity is transferred to the corresponding MSC/VLRs 304 and SGSNs 306.

Packet Data access to external networks is governed by the Gateway GPRS Support Node (GGSN) 310; the GGSN is the network entity that acts as a gateway between a GPRS wireless data network and other networks (e.g. the Internet, private networks, etc.). Among other functions, the GGSN provides requested external network access to the Serving GPRS Support Node (SGSN) 306 by converting data from GPRS data packets (i.e. SGSN format), to the external network protocol (e.g. TCP-IP).

The Radio Access Network (RAN) 308 is comprised of Radio Network Controllers (RNCs) and base stations (NodeBs). Each RNC manages a plurality of NodeBs 102. As previously mentioned, NodeBs are grouped into LAs 108, and may be further subdivided into RAs 106. The RAN manages the radio bearing elements to support CS and PS traffic. The Core Network 110 is not involved in radio resource allocation.

Exemplary Routing Area Update

Referring now to FIG. 3A and FIG. 3B, the entities involved in an RA update process are shown interacting during a typical update process.

In FIG. 3A, the UE 152 detects the presence of an additional base station 102B. It reads the system information broadcasted by the base station and determines that the new base station belongs to the same PLMN, but is in a different RA 106B than that to which the UE is currently allocated. The UE performs measurements to gain information about the signal strength. The new base station's signal strength is higher than the threshold for a cell update. If the UE has an RRC connection, it will perform an RA update using the existing connection to optimize the data routing (FIG. 3B).

A UE 152 in idle mode cannot immediately perform an RA cell update, because the UE is not connected to either the old SGSN 306B or the new SGSN 306A. In order to correctly update the Core Network 110 with the new RA 106B, the UE must establish a new RRC connection. Establishment of the RRC connection requires initiation of a radio link.

The RA update procedure for UMTS systems is based on GSM mobility management procedures, as shown in FIG. 4A. The entities' Mobile Station (MS) and Base Station Subsystem (BSS) are synonymous with UE 152 and NodeB 102 respectively. The evolution in terminology originated with the change from GSM to GPRS to UMTS (2G to 2.5G to 3G networks).

The MS 152 is responsible for detecting RACs that are broadcast from the base stations 102. When an MS finds that the RAC is different from its last stored RAC, it performs an update by sending a Routing Area Update Request 402, together with its previous location, and Temporary Mobile Subscriber Identity (TMSI).

The Mobility Management Entity (MME) within the SGSN 306 identifies the user with the use of the encrypted TMSI. Under certain conditions, (e.g., if the user has not been authenticated), the MME will require an authentication and key agreement (AKA) to complete successfully 404. After the UE 152 and MME have completed the AKA, and mutual authentication has completed, the MME updates the Home Location Register 302 (HLR), and initiates local security activation procedures. After the UE has completed local security integrity and encryption procedures, the SGSN sends a Routing Area Update Accept 406. The MS confirms receipt and setup with a Routing Area Update Complete message 408.

As shown in FIG. 4B, when the MS 152 sends the Routing Area Update Request 402 to the SGSN 306, the MS also starts a timer T3330, and changes to state GMM-ROUTING-AREA-UPDATING-INITIATED. The BSS adds the Cell Global Identity, including the RAC and LAC of the cell where the message was received, before passing the message to the SGSN 306. Security functions may also be executed 404. After any such security procedures are completed, the SGSN validates the MS' presence in the new RA 106B. If, due to regional subscription restrictions, the MS is not permitted to be attached in the RA, or if subscription checking fails, the SGSN rejects the Routing Area Update with an appropriate cause 408. To limit the number of subsequently rejected Routing Area Update attempts, a Routing Area Updating attempt counter is introduced. Depending on the value of the Routing Area Updating attempt counter, specific actions are performed. The Routing Area Updating attempt counter is reset when a Routing Area Updating procedure is successfully completed, when the MS is in sub-state ATTEMPTING-TO-UPDATE and a new RA is entered, the timer T3302 has expired, or the registration function requests termination. A Routing Area Update Rejection 408 carries a code which identifies the cause of rejection; these codes are shown in FIG. 4C. Upon reception of certain cause codes, such as #96, 99, or #111 (shown in FIG. 4C), or #95 (semantically incorrect message) or #97 (message type non-existent or not implemented), not shown in FIG. 4C, the MS 152 will set the Routing Area Updating attempt counter to a value of five (5). If the procedure is restarted four times, then on the fifth expiry of timer T3330, the MS will abort the procedure. If the Routing Area Update procedure fails a maximum allowable number of times, or if the SGSN 306 returns a Routing Area Update Reject message, the MS will remain in the IDLE state.

If all checks are successful, the SGSN 306 updates the MM context for the MS 152, and a Routing Area Update Accept 406 message is sent to the MS. A Routing Area Update Complete 408 message is returned to the network only if the Routing Area Update Accept 406 message contained a new P-TMSI or a request for the provision of the Inter RAT information container.

A limitation of the prior art location update procedure occurs when the number of UEs 152 initiating location updates exceeds network capabilities. In the previously discussed example illustrated in FIG. 1A, as the passenger train crosses the LA/RA boundary, the sudden influx of simultaneous registration traffic exceeds typical network traffic, creating an overload of network resources as the number of simultaneous random accesses lead to collisions, and subsequent multiple attempts (a "cascade" effect of sorts, since each collision breeds at least two subsequent attempts). In an extreme case (e.g. Tokyo rush hour) this network overflow could occur as often as once every few minutes or more.

Several solutions have been contemplated in the prior art which relate to multiple Location Area/Routing Area updates. For example, U.S. Pat. No. 6,556,820 to Le, et al. issued Apr. 29, 2003 and entitled "Mobility management for terminals with multiple subscriptions" discloses a scheme for providing mobility management for terminals with multiple subscriptions. The invention integrates Europe's Universal Mobile Telecommunications Standard (UMTS) subscriber identity module-specific procedures into single procedures, and which uses a common TMSI. An UMTS subscriber identity module is allocated for each subscription associated with a mobile terminal, wherein each UMTS subscriber identity module being identified by an identification code. A location area update is performed by providing a single location area update request message comprising a list of identification codes for each UMTS subscriber identity module associated with the mobile terminal. Each USIM is authenticated separately, and some USIMs may fail, while others may succeed authentication. The terminal and network each build their own Ordered List of Registered USIM-IDs (OLRU) which records the USIMs that succeeded. The network assigns a Base TMSI, which is similar to the current assignment of TMSIs. Subsequent Location Area Update procedures use the Base TMSI, which is common to all USIMs in the OLRU. Thus it does not have to be repeated for each USIM. Paging Request uses the Base TMSI, along with a USIM Specifier (USIMS) field, which specifies which USIM(s) is being paged. USIMS is kept very compact with bit string coding, which also gives flexibility to page multiple USIMs at the same time. The terminal and network interpret the bit string by using the OLRU. The terminal has to listen to only one paging subchannel. The paging subchannel is determined by calculating the sum modulo N of the last digits of the USIM-IDs in the OLRU. N is the number of possible subchannels.

U.S. Pat. No. 6,968,190 to Suumaki, et al. issued Nov. 22, 2005 and entitled "Transfer of optimization algorithm parameters during handover of a mobile station between radio network subsystems" discloses a method whereby instead of renegotiating parameters relating to an optimization algorithm previously negotiated between a mobile station and a target radio network subsystem during connection handover of the mobile station from a source radio network subsystem, prestored parameters are transferred instead between the source radio network subsystem and the target radio network subsystem either directly over an existing Iur interface or via a core network over an Iur interface.

U.S. Pat. No. 6,968,196 to Back, et al. issued Nov. 22, 2005 entitled "Location area update in a communication system" discloses a method and a controller for a radio communication system. The system comprises a plurality of location areas. The controller serves said location areas and mobile stations within said location areas. In accordance with the method a request for initiation of location area information update proceedings is received at the controller. The controller then verifies whether the mobile station is subjected to a simultaneous paging procedure. If a simultaneous paging procedure is detected, the location area information update proceedings are interrupted and an acknowledgement message is generated and transmitted, said message informing the mobile station that the location area information update proceedings are completed.

U.S. Pat. No. 7,181,212 to Hogan, et al. issued Feb. 20, 2007 and entitled "Method and apparatus for location area updating in cellular communications" discloses a radio access network that provides information to a mobile radio terminal indicating a list of one or more geographic coverage areas from which the mobile radio terminal may or may not obtain service. In the preferred example embodiment, a "forbidden" list includes one or more geographic coverage areas from which the mobile radio terminal may not obtain service. The mobile checks the received information when considering whether to request service from a new geographic coverage area, and determines whether to select the geographic coverage area depending on that received information. Moreover, the mobile terminal consults that list to determine whether to perform a location area update procedure. In other words, if the list indicates that a new geographic coverage area should not be selected, the mobile terminal does not perform a location area update request in that new coverage area.

U.S. Pat. No. 7,333,795 to Dorsey, et al. issued Feb. 19, 2008 and entitled "Emergency call placement method" discloses an emergency call placement method used in user equipment in idle mode camped on a first cell of a wireless communication network having a first radio access technology includes the steps of requesting a radio resource control connection using "emergency call" as an establishment request, changing to a new cell in a different location area or routing area than the first cell, and requesting again a radio resource control connection using "emergency call" as an establishment request. This method avoids performing a location area update or a routing area update when the user equipment changes to a new cell during an emergency call and thus may speed up placement of the emergency call by several seconds.

U.S. Pat. No. 7,333,811 to Liu issued Feb. 19, 2008 and entitled "Method and apparatus for utilizing historical network information for mitigating excessive network updates when selecting a communications channel" discloses a method and apparatus for utilizing historical network information for mitigating excessive network updates when performing channel selection between a serving base transceiver station and an adjacent base transceiver station when determined channel selection would result in either a Location Area Update (LAU) or a Routing Area Update (RAU). If a network update, either LAU or RAU, is the first occurrence, network identification information for the LA or RA is stored and an incremental value indicating occurrence is set; else in the case occurrence is not the first, the incremental value is incremented. A first margin value is then selected if the incremented value does not meet or exceed a predetermined value, or a second margin value is selected if the incremented value does meet or exceed a predetermined value. The signal level of the adjacent base transceiver station is then compared to the reference signal level of the serving base transceiver station plus the selected margin value in order to determine channel selection.

United States Patent Publication No. 20060133347 to Das published Jun. 22, 2006 and entitled "Integrating mobility agents for short messaging services" discloses a method of providing messaging services for GSM or 3G mobile stations. A gateway detects a mobile network registration from a mobile station, and performs a location area update procedure with previous support nodes from its home public land mobile network. The gateway then receives data for the mobile station from a packet switched radio network and transmits the data for the mobile station through the mobile network.

Great Britain Patent Publication No. GB2367454 to Cheung, et al entitled "Location area and routing area update signalling in a cellular communications system" discloses A method for Combined Location Area, (LA)/Routing Area (RA) Update message signaling in GPRS and UMTS cellular communications systems that utilizes a Combined Update RA/LA message containing information of new Location Area Identity (LAI), International Mobile Station Identity (IMSI), Serving GPRS Service Node (SGSN) Number, Location Update Type, and new VLR; and an Insert Subscriber Data message 1d containing information of new LAI, IMSI, SGSN Number; and Location Update Type. This produces a signaling procedure which allows the Combined LA/RA Update to occur in parallel, and reduces the number of signaling messages required. Additionally, an Insert Subscriber Data Acknowledge message may contain information of VLR TMSI (Temporary Mobile Station Identity), allowing another message to be saved.

U.S. Pat. No. 6,937,868 to Himmel, et al. issued Aug. 30, 2005 and entitled "Apparatus and method for managing a mobile phone answering mode and outgoing message based on a location of the mobile phone" discloses an apparatus and method for managing a mobile phone answering mode and outgoing message or other indicator based on a location of the mobile phone. The apparatus and method make use of a location system to ascertain the current location of a mobile telephone being carried by a user. Based on the current location, the apparatus and method determine whether operation of the mobile telephone to receive and/or send calls should be restricted. In addition, the apparatus and method determine an appropriate outgoing message to be provided to calling parties while the mobile telephone is located in an area where use of the mobile telephone to receive calls is prohibited. The particular outgoing message provided is customized to the current location of the mobile telephone and optionally, the caller ID of the calling party.

U.S. Patent Publication No. US2007213057 to Shaheen entitled "Method And Apparatus For Supporting Routing Area Update Procedures In A Single Tunnel GPRS-Based Wireless Communication System" discloses a method and apparatus for supporting routing area update procedures in a single tunnel general packet radio services (GPRS)-based wireless communication system are disclosed. A wireless transmit/receive unit (WTRU) sends a routing area update request message to a serving general packet radio service (GPRS) support node (SGSN) via a radio network controller (RNC). The SGSN sends an update packet data protocol (PDP) context request message to a gateway GPRS support node (GGSN). The GGSN sends an update PDP context response message to the SGSN. The SGSN sends a tunnel establishment request message to the RNC and a single tunnel is established between the RNC and the GGSN. For handover operations, a previous single tunnel established between the GGSN and another RNC is released and the routing area update is accepted and completed.

WIPO Publication No. WO9930524 to Monrad, et al entitled "Method For Routing Area (RA) Update" discloses a method for routing area (RA) update request messages which in accordance with a time period broadcasted from the network are periodically sent from an MS (Mobile Station) to an SGSN (Serving GPRS Support Node) through a BSS (Base Station System), which SGSN supports GPRS (General Packet Radio Service), and which as a result of a routing area update procedure will return an appropriate accept message, and for the purpose of taking into account the differentiation in nature of normal routing area update procedure and periodic updates, it is according to the present invention suggested that for the purpose of simplifying said routing area update procedure, there is broadcasted a new indicator from the network together with the time period for the periodic routing updates, said indicator being adapted to determine whether the periodic routing update procedure is performed ciphered instead of unciphered.

Despite the foregoing variety of approaches, the prior art fails to provide an adequate solution for mitigating a sudden influx of simultaneous registration attempts within a wireless network, such as in the exemplary UMTS context previously described. Accordingly, a solution is needed which promptly and effectively manages (e.g., preemptively diffuses) a plurality of access or update attempts by a plurality of UEs concurrently initiating location updates when transitioning from one LA/RA to another LA/RA.

Ideally, such improved methods and apparatus would be transparent to the user, so as to maintain a high level of "user experience" and avoid interruptions and loss of service. They would also be consistent with and even leverage existing wireless infrastructure, network policies, and functional capabilities, and would minimally impact the software and hardware apparatus of both the client devices and base stations involved (including having a minimal or no impact on power (e.g., battery charge) consumption.

SUMMARY OF THE INVENTION

The present invention satisfies the foregoing needs by providing, inter alia, improved methods and apparatus for managing and avoiding congestion in a wireless (e.g., cellular) network.

In a first aspect of the invention, a method for reducing network access congestion on a wireless network is disclosed. In one embodiment, the network has a plurality of wireless devices associated therewith, and the method comprises: monitoring a first channel to detect a plurality of requests issued by respective ones of the plurality of wireless devices; determining when a triggering criterion has been met based at least in part on the monitoring; and sending a plurality of responses on a second channel to the respective ones of the plurality of devices, the responses imposing a multiple access scheme on subsequent access request messages from the respective ones of the plurality of wireless devices, the multiple access scheme reducing congestion within at least a portion of the network.

In one variant, the multiple access scheme comprises staggering of the plurality of subsequent request messages in response to receiving the plurality of response messages.

In another variant, the wireless network comprises a UMTS-compliant system, the first channel comprises a RACH channel, the second channel comprises an AICH channel, and the triggering criterion is met at least in part based on the substantially contemporaneous crossing of a geographic boundary of a prescribed number of the wireless devices.

In yet another variant, the act of monitoring occurs periodically during a historically congestive event such as a metropolitan area rush hour.

In a further variant, the wireless network comprises a UMTS-compliant system, and the requests comprise at least one of: (i) location area (LA) and/or routing area (RA) update requests, or (ii) RRC (connection) requests.

In still another variant, the wireless network comprises a relay station, and prior to sending the plurality of responses on the second channel, the method further comprises disabling uplink and downlink communications at the relay station. The method further comprises setting a timer value and waiting for the timer value to expire prior to re-enabling the uplink and downlink communications at the relay station.

In another variant, the network comprises a cellular network comprising a base station and a relay station, the relay station being in communication with the base station and at least a portion of the plurality of wireless devices, and the acts of monitoring and sending are performed by the relay station.

In a second aspect of the invention, a computer readable apparatus is disclosed. In one embodiment, the apparatus comprise a storage medium storing at least one computer program, the program comprising a plurality of instructions which, when executed by a processing device: monitor an access channel of a wireless network to determine a number of wireless devices that intend to issue an access request message; and send a plurality of negative response messages on a synchronization channel of the wireless network if the number of wireless devices that intend to issue an access request message exceeds a threshold value.

In one variant, the threshold value corresponds to a level of network congestion value that would substantially degrade the operation of the wireless network, and the computer readable apparatus comprises a storage device of a relay station within the wireless network.

In another variant, the network comprises a 3G cellular network, the access channel comprises a RACH, the synchronization channel comprises an AICH, and the monitoring of the access channel comprises monitoring for RRC connection or LA/RA update requests from the wireless devices.

In yet another variant, the method further comprises disabling uplink and downlink communications at the relay station if the number of wireless devices that intend to issue an access request message exceeds a threshold value.

In a third aspect of the invention, a congestion-avoidance system for use in a wireless network is disclosed. In one embodiment, the system comprises: an access node; a relay station in wireless signal communication with the access node; and a plurality of wireless devices configured to at least communicate indirectly with the access station via the relay station. The relay station comprises apparatus adapted to cause delay of a plurality of access request messages to the access station whenever the number of the plurality of wireless devices expected to issue the access request messages exceeds a prescribed criterion.

In one variant, the relay station is disposed proximate to a geographic location area/routing area boundary in a cellular network.

In another variant, the apparatus adapted to cause a delay comprises logic adapted to issue NACK (no acknowledgement) messages to respective ones of the wireless devices requesting a connection, the NACK causing the wireless devices to invoke the delay on a subsequent request transmission.

In a fourth aspect of the invention, apparatus for reducing network access congestion is disclosed. In one embodiment, the network comprises a wireless network, and the apparatus comprises: a receiver; a transmitter; a processing device; and a memory. The memory comprises a computer program having instructions which, when executed by the processing device: detects when the number of wireless devices that intend to issue an update request message will meet a given criterion; receives via the receiver a plurality of requests on an access channel; and transmits a plurality of negative response messages on a synchronization channel in response to at least a portion of the received requests.

In one variant, the apparatus comprises a relay station resident at a geographic location area/routing area boundary in a cellular network.

In a second variant, the access channel comprises a RACH channel, the synchronization channel comprises an AICH channel, and the given threshold is exceeded when the number of wireless devices that intend to issue an update request message cross a geographic boundary.

In another variant, the update request message comprises a location area (LA) and/or routing area (RA) update request, and the requests comprise radio resource control (RRC) connection requests.

In a fifth aspect of the invention, a method of operating a cellular communication system so as to avoid simultaneously receiving an excessive number of requests for a service on a first channel is disclosed. In one embodiment, the method comprises sending a message on a second channel, the message resulting in a staggering of the requests. In one variant, the cellular system comprises a 3G system, the first channel comprises a RACH channel, the second channel comprises an AICH channel, and the excessive number of requests are triggered by the substantially simultaneous crossing of a geographic boundary by a plurality of users of the 3G system.

In another variant, the message sent on the second channel is indicative of a collision between two or more of the requests when in fact such requests had no such collision.

In a sixth aspect of the invention, a method of reducing the power consumption of mobile devices used within a wireless network is disclosed. In one embodiment, the mobile devices each comprising a first protocol and a second related protocol, and the method comprises: receiving requests according to the first protocol from respective ones of the mobile devices; and issuing responses to the requests according to the first protocol, the issuing causing respective ones of the mobile devices to avoid invoking the second protocol for at least a period of time. The second protocol would be invoked by the mobile devices but for the issued responses; and the avoidance of the second protocol causes a reduction in power consumption within the mobile devices as compared to the power consumption associated with operating according to the second protocol.

In one variant, the reduction in power consumption within the mobile devices as compared to the power consumption associated with operating according to the second protocol is due at least in part to avoiding multiple request retransmission attempts associated with the second protocol. The multiple request retransmission attempts result from e.g., collisions occurring between respective ones of the mobile devices that are requesting access to the network.

In another variant, the issuing responses is based at least in part on an evaluation of the requests received according to the first protocol; the first protocol comprises a channel connection request, and the second protocol comprises a network update request.

In another embodiment, the mobile devices each comprising a first protocol and a second protocol, the first protocol having a first power consumption associated therewith, and the second protocol having a second, greater power consumption associated therewith, and the method of reducing power consumption comprises: receiving a plurality of requests issued by respective ones of the mobile devices according to the first protocol; and spoofing collisions of the requests by sending responses to the issuing mobile devices that are indicative of a collision. The spoofing causes the issuing mobile devices to enter an operational mode for at least a period of time that does not utilize the second protocol; and without the spoofing, the second protocol would be utilized.

In one variant, the first protocol comprises a channel connection request, the second protocol comprises a network update request, and the spoofing comprises sending NACK messages indicative of collisions when in fact no such collisions have occurred.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 4C is a table listing exemplary prior art RA update rejection codes.

DETAILED DESCRIPTION OF THE INVENTION

Figure 1:
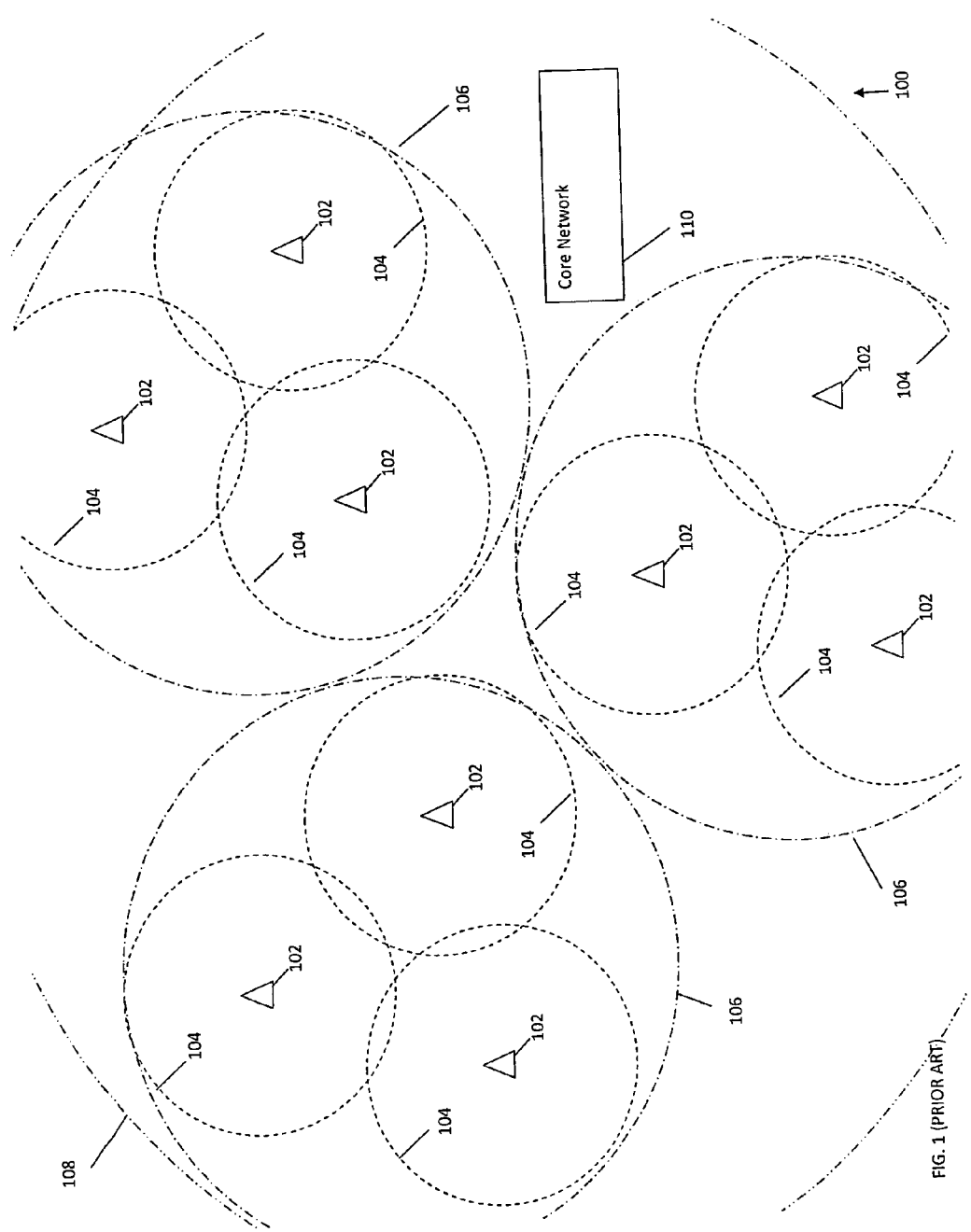
FIG. 1 illustrates an exemplary prior art UMTS cellular system architecture.

Reference is now made to the drawings, wherein like numerals refer to like parts throughout.

As used herein, the terms "client device", "end user device" and "UE" include, but are not limited to, cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

As used herein, the term "platform" refers to any type of mobile apparatus or user which may comprise one or more client devices capable of wireless communication, such as (without limitation): passenger trains, subways, elevated rail, buses, automobiles, aircraft, or watercraft (e.g., ferries, cruise liners, military ships). For instance, a plurality of users all walking down a crowded thoroughfare in a city towards a train station, or each driving in their auto toward a bridge, might each or collectively comprise a "platform" for purposes of the present invention. Similarly, one or more tour buses driving down a highway (e.g., individually, or as a caravan) might comprise one or more platforms.

As used herein, the term "wireless" means any wireless signal, data, communication, or other interface including without limitation WiFi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one fundamental aspect, the present invention provides methods and apparatus for detecting and managing a probable congestion event caused by a plurality of mobile or client devices attempting to access the network in a brief or overlapping period of time. A congestion management entity is used to detect a plurality of individual initial access attempts. Due to the relatively simple nature of initial access signaling, this entity advantageously does not require additional demodulation or processing circuitry (i.e., additional circuitry beyond the demodulation circuitry required for normal operation). Furthermore, the management entity, having determined that a minimum threshold of access attempts or other prescribed criterion has been met, preemptively triggers an access collision transaction. This preemptive access collision transaction advantageously reduces processing burden on the base station. Specifically, in one embodiment, the access collision transaction embodied as a "NACK" sent back to the client devices (e.g., UMTS UEs) causes these client devices to halt current access attempts, and implement an access scheme (such as for example a backoff for a random amount of time before attempting further access attempts). This comparatively early or preemptive detection of collision(s) inter alia reduces the UE's power consumption, as access attempts would ordinarily be allowed to proceed much further before being rejected.

In one embodiment of the invention, operation within a UMTS cellular network is disclosed. A relay station or repeater that includes the aforementioned congestion management entity receives and retransmits both the Physical Random Access Channel (PRACH), and Acquisition Indicator Channel (AICH). In one exemplary congestion event, a plurality of UEs entering a new LA/RA simultaneously (e.g., via a passenger train, bus, or other platform), are attempting to initiate Radio Resource Connections (RRC) connections via signaling on the PRACH. If the relay station determines that the number of RACH attempts is greater than the network capability, then it does not amplify these RACH communications. Instead, the relay station preemptively transmits a NACK on the AICH, which is interpreted by the UEs as a collision. The modified behavior of the relay station is advantageously transparent within the UMTS system, as RACH and AICH channels for both UE and base station perform in a manner identical to their normal operation.

In another aspect of the invention, the function of the aforementioned entity may be implemented within a cellular base station, or a base station-like element (e.g. a 3G femtocell). While implementation of the congestion management and avoidance entity within a relay station has certain spatial advantages such as extended range, more time for collision detection, etc., this entity may be implemented within alternate structures, and still perform functions providing significant advantages over prior art systems which are prone to such congestion.

DETAILED DESCRIPTION OF EXEMPLARY EMBODIMENTS

Exemplary embodiments of the present invention are now described in detail. While these embodiments are primarily discussed in the context of a UMTS wireless network, and more specifically to congestion avoidance during LA/RA updates, it will be recognized by those of ordinary skill that the present invention is not in any way limited to such UMTS networks or to any particular context such as the aforementioned LA/RA updates. In fact, the principles of the present invention may be readily adapted to any wireless network (even non-cellular networks) in which network congestion, as generally described herein, may become problematic, such as for example GSM (e.g., "2G" or "2.5G") networks.

Methods

Figure 5:
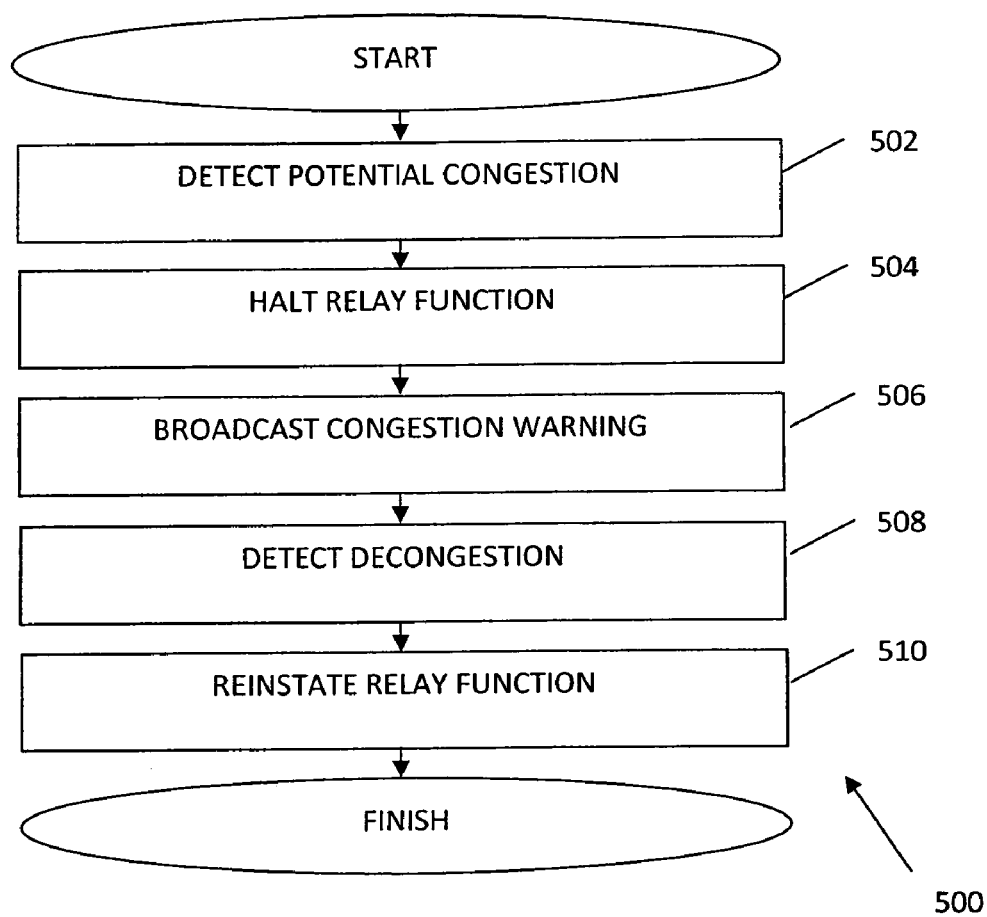
FIG. 5 is a logical flow diagram illustrating one embodiment of the generalized intelligent relay procedure for implementation by a relay station in accordance with the principles of the present invention.
Figure 5A:
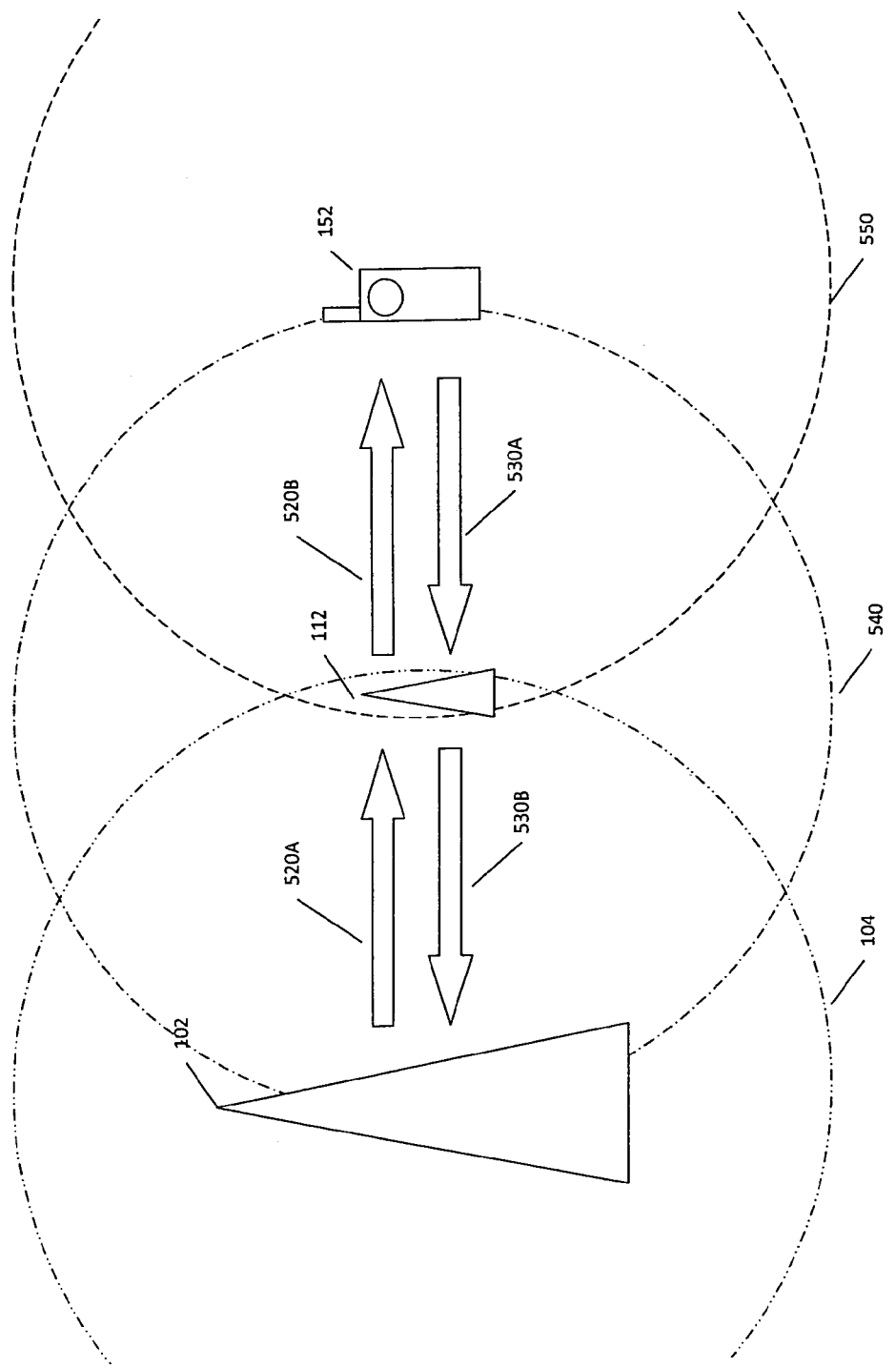
FIG. 5A is a graphical representation of an exemplary cellular system utilizing an intelligent relay station according to the invention.

Referring now to FIGS. 5-5A, one embodiment of the generalized intelligent relay procedure 500 for implementation by a management entity (e.g., coincident or co-located with a relay station or repeater) is described. The operative elements as described with respect to the methodology of FIG. 5 are one or more users with client devices (e.g., UEs 152), a relay station 112 and a base station (e.g., NodeB 102).

As shown in FIG. 5A, the initial conditions of the exemplary intelligent congestion management and avoidance procedure require that a relay station or repeater 112 is located generally between or proximate with a plurality of users 152 and a base station 102. It will be appreciated that as used in the present context, the term "between" does not necessarily connote a line-of-sight or physical alignment of the three nodes (NodeB, relay, and UE/platform), but rather merely an ability of the UE/platform and NodeB to communicate with the relay station at the same time. As illustrated, the base station has a first wireless coverage 104, the relay station has a given wireless range 540, and the user has its own wireless range 550. Therefore, the base station and plurality of users are isolated from each other without the benefit of relay station assistance.

The relay station 112 receives downlink transmissions 520A (FIG. 5A) from the base station 102, and amplifies them for transmission creating a "relayed downlink transmission" 520B. Similarly, the relay station receives uplink transmissions 530A from the user 152, and amplifies them for retransmission creating a "relayed uplink transmission" 530B. The relay station may or may not implement data correction or other data processing on the retransmitted signals, depending on the implementation.

At step 502 (FIG. 5), the relay station 112 detects impending congestion caused by a plurality of users 152 attempting access to the base station 102 simultaneously, or nearly simultaneously. The relay station monitors for a triggering event. In one embodiment, uplink transmissions 530A within the user frequency band are monitored.

In an exemplary UMTS system, an RRC connection must be established before an UE is able to send any NAS (Non-Access Stratum) messages. An UE which is in an idle state (listening for page requests) will initiate an RRC connection setup request. The UE will transition to the RRC_connected state after a successful connection establishment. Only during the RRC_connected state can NAS messages (such as Location Area Update) be sent. A large number of Location Area Updates (such as where a train in Tokyo with many passengers aboard crosses the border of a Location Area) will cause many UEs to perform a RRC connection request at the same time. However, the RRC connection will not be established, as the collisions occur on the initial transition from idle to RRC_connected mode. Thus, the relay system may monitor the number of PRACH 252 access attempts (which correspond to a UE attempting a RRC_connection_request) within a given period of time. If the number of PRACH access attempts exceeds a threshold value (i.e. a trigger event), the relay system will take corrective actions.

It will be appreciated that this threshold value/period of time (or even more broadly a triggering event of any kind) may also be varied dynamically as a function of time, network conditions, etc. For instance, in one variant, the threshold number of access attempts per unit time is set to a first value for "low" network loading conditions (since the network can ostensibly handle a greater level of congestion when it is otherwise lightly loaded than when it is more heavily loaded), and a lower second value during more heavily loaded conditions. The network loading can be determined, for example by way of previously determining how many UEs are in an RRC_connected state and/or how many are in an idle state. This information is readily available in the network and can be used to forecast an impending overload. Hence, the "sensitivity" of the congestion avoidance trigger can be modified dynamically if desired.

In another variant, the threshold trigger values are varied programmatically as a function of time of day and/or date. This may be based on e.g., historical data for the same network. For example, the relay station may monitor for trigger events during certain portions of the day (e.g. those associated with weekday rush hour traffic). Similarly, a "weekend" program might employ a different threshold trigger variation profile (as a function of the time of day) than that used for a weekday, since less users, automobile users, riders of passenger trains, etc. would be present within the city on at least most weekends.

It will also be appreciated that the threshold trigger or other triggering criteria may also be varied spatially within the network. For example, the trigger or criterion used in cells serving a more rural or residential setting may be different than that employed in cells used in an urban (city) setting, since the latter ostensibly has a much greater spatial density of users (such as by way of the aforementioned passenger trains), and also a greater expected spatial/temporal density (i.e., not only more users, but more users using their cellular telephones during any given period of time, especially those corresponding to the morning commute into the city, lunchtime, and the afternoon or evening commute out of the city). Hence, certain geographic regions of a service provider's network coverage can be a priori "mapped" for average user density at given periods of the day/week, and the thresholds or triggers adjusted accordingly if desired.

In another embodiment, the relay station 112 monitors an external event that historically correlates with congestive conditions in the network. For example, the relay station may trigger congestion management/avoidance preemptively with the arrival of a passenger train 150 at a train station.

In other embodiments, the existence of a prescribed condition such as an emergency may invoke the congestion management and avoidance process. For example, the existence of extreme congestion might potentially impede use of the network for emergency use (such as by police or firefighters during a city-wide emergency). Hence, placing all relay stations 112 in that city into congestion management/avoidance mode would help guarantee that normal events such as passenger trains crossing LA/RA boundaries during rush hour would not congest the network as a whole (or portions thereof).

Alternatively, the trigger event may not be triggered by entities external to the network at all. Rather, in another embodiment, the relay station may receive its trigger from the network itself (e.g. via a NodeB MME of the type previously described herein, which has been modified with the trigger functionality of the invention).

In yet another implementation for detecting potential network congestion, it may be desirable for the relay station to only monitor or execute on trigger events when some other threshold is met. For example, it may be desirable in some embodiments for the relay station to first detect a minimum number of users within its geographic vicinity prior to monitoring and/or executing on a trigger event (the latter being based on the number of actual requests, versus merely the number of users). This approach is illustrative of the broader principle of "combined" or "condition-precedent" trigger structures or algorithms that will be readily appreciated by those of ordinary skill given the present disclosure. Such combined or condition-precedent trigger schemes may be coincidental in nature (i.e., two or more conditions must simultaneously exist for the congestion management/avoidance algorithms to be implemented), or serial/hierarchical (i.e., a series of events must occur in a prescribed sequence).

In yet another embodiment, the trigger event for the relay station may comprise or be detected via the demodulation of a radio signal. For example, this might comprise demodulating control channels detectable by the relay station, similar in operation to those methods currently being executed by UEs in a wireless network.

One significant benefit of the foregoing approaches is the preemptive or anticipatory detection of the congestion event. In effect, detection via the attempts to establish RRC connections with a NodeB gives a substantial "early warning" of congestion, as contrasted with an approach which might detect congestion contemporaneously with its occurrence, when perhaps it is too late to take any meaningful corrective action or abatement. Stated differently, the exemplary embodiments of the present invention see the problem coming and avoid it, rather than running squarely into the problem and trying to recover thereafter.

At step 504 of the method 500 of FIG. 5, the relay station 112 disables the retransmitted uplink 530B and/or downlink 520B communications in response to the detected trigger event. The amplification of the uplink signals must be disabled, because the relay station is NACKing the requests on behalf of the NodeB to prevent overloading the NodeB. The downlink may be disabled; however, cutting off the downlink signals could adversely affect previously established connections. The NodeB will not answer RRC connection requests, as the issued requests never reached the NodeB (recall that the disabled uplink channel effectively isolates NodeB); therefore there is no issue in continued amplification of the downlink signals. In certain other systems, such as Time Division Duplexing (TDD), it may be impossible to distinguish between uplink and downlink. As TDD systems do not have separate frequencies for uplink and downlink, the repeater would operate as a pure LAU blocking system.

It will be appreciated that such disabling may be conducted on a complete or partial basis, such as where all UEs are "blocked", or only a subset thereof. This subset can be chosen according to any number of different schemes. Depending on the 16 or 32 possible different preambles sent by one UE on the RACH the NodeB (or the repeater in this case) could NACK/ACK one to all of them in one answer message depending on the code that is used in its response. In one example, the LAU blocking repeater could NACK all preambles from 15 to 0, and their corresponding respond messages on the AICH. In other examples, the LAU blocking repeater could NACK the requests in all time slots, every second, every third, etc. More complex solutions would be required to NACK a specific UE and ACK another one.

After such disabling, the base station 102 and "blocked" users 152, as discussed previously, are now operating in isolation from one another. In one embodiment, the uplink and downlink signals as a whole are separated into distinct physical or logical channels, with the relay station disabling relay functionality for those "congested" portions of this plurality of channels only. In an illustrative example in the context of a UMTS network, the PRACH 252 uplink channel, and the AICH 254 downlink channels of the UMTS system are disabled. Other channels not affected by the congestive event remain relayed, so as to maintain uninterrupted service to the non-congested usage. For instance, dedicated channels already assigned to specific to users (such as e.g. Dedicated Physical Data Channels (DPDCHs), Dedicated Physical Control Channels (DPCCHs), etc.), or shared control channels (such as e.g. Common Pilot Channel (CPICH), Synchronization Channel (SCH), etc.) would remain relayed.

At step 506, the relay station 112 preemptively broadcasts a congestion event signal. Reception of this message by each of the users causes the plurality of users 152 to postpone their base station accesses. Within a UMTS system, a random access collision on the PRACH 252 is signaled to the UE using a NACK 208, which is sent on the AICH 254. The relay station, having disabled access between the NodeB and the plurality of UEs, generates a NACK on the AICH, thereby removing processing burden on the NodeB (i.e. the NodeB never receives the congested random access attempts, and never generates the corresponding NACKs).

At step 508, the relay station 112 waits for the network to decongest. In one exemplary embodiment, the relay station may passively set a timer, and wait until the timer has expired. The value of the timer may be for example predetermined, selected from a list of possible values, or dynamically determined based on e.g., operational conditions, time of day, etc. Alternatively, the relay station may actively monitor one or more parameters relating to congestion, such as monitoring the user uplink 530A to determine when the uplink accesses have ceased. For instance, within the exemplary UMTS system, the relay station can actively monitor the PRACH 252, waiting for the plurality of UE 102 PRACH preambles to drop below a minimum acceptable threshold. In yet another embodiment, the relay station is signaled by the network (e.g. via the Mobility Management Entity), that the network has decongested based on its evaluation thereof, and that communications can proceed as normal.

At step 510, the relay station 112 reinstates its amplification and repeating functionality. A non-congestive multiple access scheme is then employed. In one variant, this scheme comprises the plurality of users (UEs) reinitiating uplink 530 transmissions at randomized (or pseudo-random) times; e.g., using a random backoff timer or the like. Within the exemplary UMTS system, a UE 152 which has received a NACK 208 will postpone further access attempts for an internally randomized amount of time. The plurality of UEs, each operating with an individual randomized time, will elongate the time period for which access attempts are made. The outer boundaries of this "extended period" can also be determined in advance and communicated to the UE; the duration of the extended period can also be varied dynamically to accommodate prevailing conditions. For instance, when the number of users is high enough to trigger congestion avoidance, but not very far above that number, a first range of allowed backoffs may be used, whereas another (larger) range could be employed when the number of users greatly exceeds the trigger threshold. This approach helps avoid collisions between UEs who are autonomously selecting backoff intervals; the greater the number of allowed backoff times or increments, the more UEs can be accommodated without significantly increasing the likelihood of collisions.

It will be appreciated that other multiple access schemes may be implemented consistent with the invention at step 510 to avoid congestion. For example a carrier sense with or without collision detection or collision avoidance (CSMA/CD or CSMA/CA) approach of the type well known in the art could be utilized. Under such schemes, instead of using purely a randomized backoff timer, the carrier is sensed for the presence of other users, with communication for a given user only permitted when no other potentially interfering use is detected. Where multiple channels or carriers exist, a frequency-hopped approach (which relies on a random or pseudo-random hop sequence) may be used.

However, it is noted that the randomized backoff scheme previously described carries with it the advantage of not having to modify or change the UE in any way in order to be compatible with the relay station. Specifically, the relay station 112 issues the NACK 208 to the UE, and effectively fools the UE into thinking that a collision has occurred. The indigenous UMTS mechanism present in the UE for handling such collisions is then leveraged to invoke the desired multiple access scheme (i.e., random backoff for subsequent requests). Accordingly, no special upgrades or additions to extant UE logic or software are required to implement this embodiment of the invention. Notwithstanding, the invention is in no way limited to this approach, and the UE can readily be modified if desired (such as via a flash/software upgrade) to invoke other or specialized multiple access schemes apart from the randomized variant described above.

Additionally, it will be recognized that the trigger event and mode transition (i.e., from normal operation to congestion management/avoidance mode) may also be implemented in a progressive fashion, as opposed to an "on/off" type of paradigm. For example, consider the case where the relay station 112 or other entity monitors the number of update requests per unit time as previously described. Under the "on/off" paradigm, once the threshold number of requests (or other criterion) is met, the avoidance mode is entered, and persists for a period of time until the network is "decongested" (see step 510 above). This approach is largely predicated upon the assumption that a large number of UEs will cross the LA/RA boundary within a short period of time, such as via the aforementioned rapidly moving passenger train having thousands of riders. However, an alternative scheme may be employed wherein the extent of congestion is assessed (such as by the number of requests per unit time being measured for several successive intervals and graded as "high", "medium" or "low" congestion threat, and whether the number is increasing or decreasing interval to interval ("acceleration/deceleration")), and progressively greater or less blocking of UEs imposed by a relay station as the threat of congestion increases or decreases, respectively. This "progressive" approach is more adapted to situations where the congestion resulting from the UE requests (e.g., LA/RA boundary updates) are not as temporally coherent, but rather are spread out over a longer period of time. Such might be the case where a plurality of smaller trains (perhaps a few hundred passengers per train, versus a few thousand in the previous scenario) are leaving a station on a slightly staggered schedule. No single train crossing the same LA/RA boundary saturates or overly congests the network, but rather a more moderate degree of congestion is experienced for an extended period of time as each of the different trains crosses the boundary in succession or even in tandem.

Hence, under a "on/off" management scenario in this multi-train example, the threshold number of users (correlated to significant impending congestion) will never be reached due to the reduced temporal coherence of the different trains, yet an appreciable level of congestion (albeit not fatal) might be caused, and may persist for a fairly lengthy period of time depending on the number of trains, their staggering, the number of passengers (UEs) on each, and so forth. By employing a progressive congestion management approach such as that described above, an appropriate amount of congestion management/avoidance (e.g., relay station blocking of RACH requests and issuance of NACKs back to the requesting UEs) can be applied dynamically over time so as to mitigate the effects of the congestion without imposing a blanket "shutdown" of the relay functions of the station(s) 112 that are involved. This approach may also be generalized for management of congestion due to large traffic flow, having rises and falls in a fairly progressive and predictable fashion.

As yet another alternative, groupings of relay stations 112 can selectively implement congestion management/avoidance on a per-station basis in a progressive manner; e.g., start with one station blocking all or subset of its requests, then a second station in proximity thereto, and so forth.

Figure 5B:
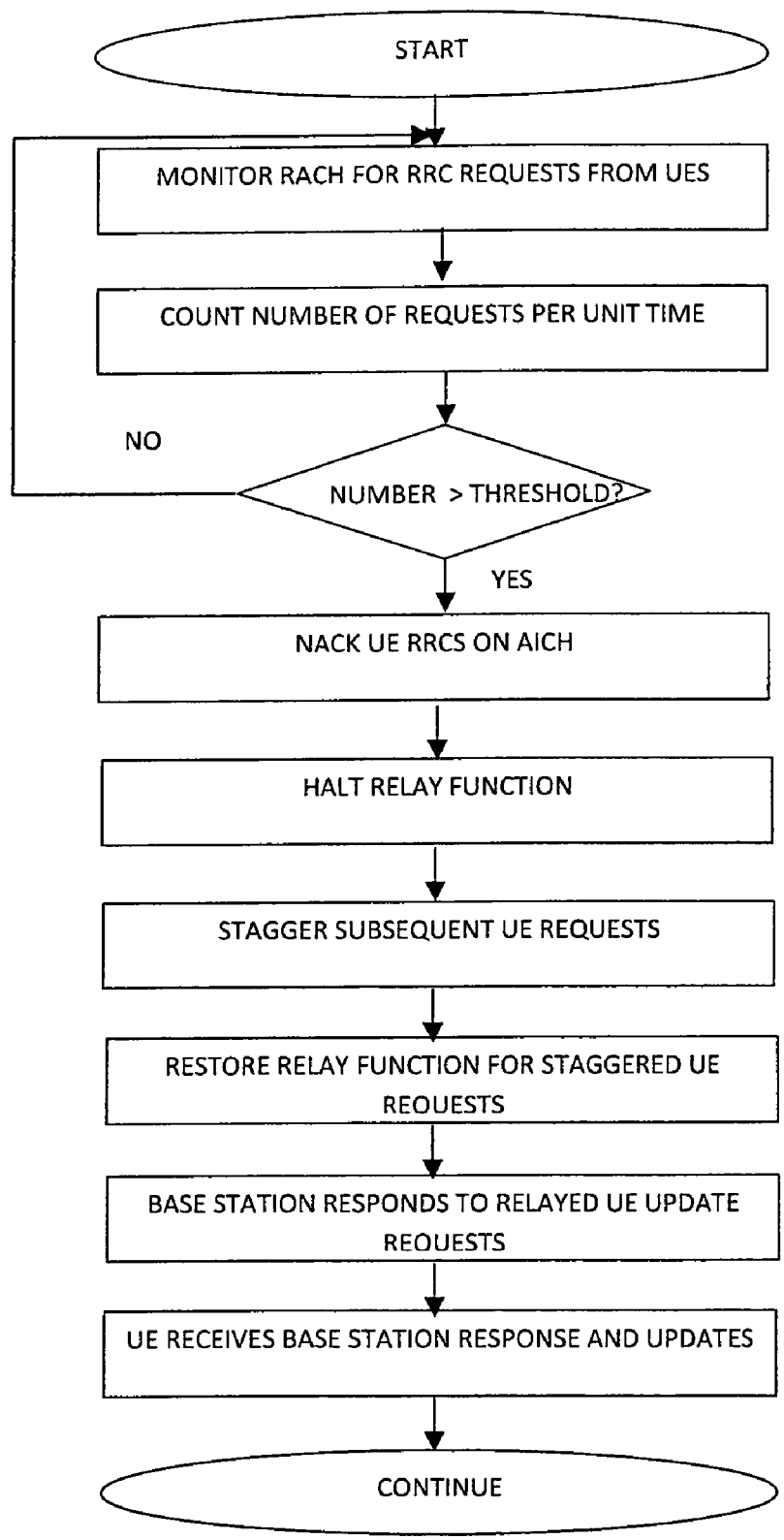
FIG. 5B is a logical flow diagram illustrating one implementation of the generalized methodology of FIG. 5 for a UMTS network having a relay station and a plurality of UEs.

FIG. 5B illustrates one exemplary implementation of the generalized methodology of FIG. 5 in the context of a UMTS network with relay station and UEs operating with RACH and AICH channels, and requesting LA/RA updates.

Example Case #1

Figure 1A:
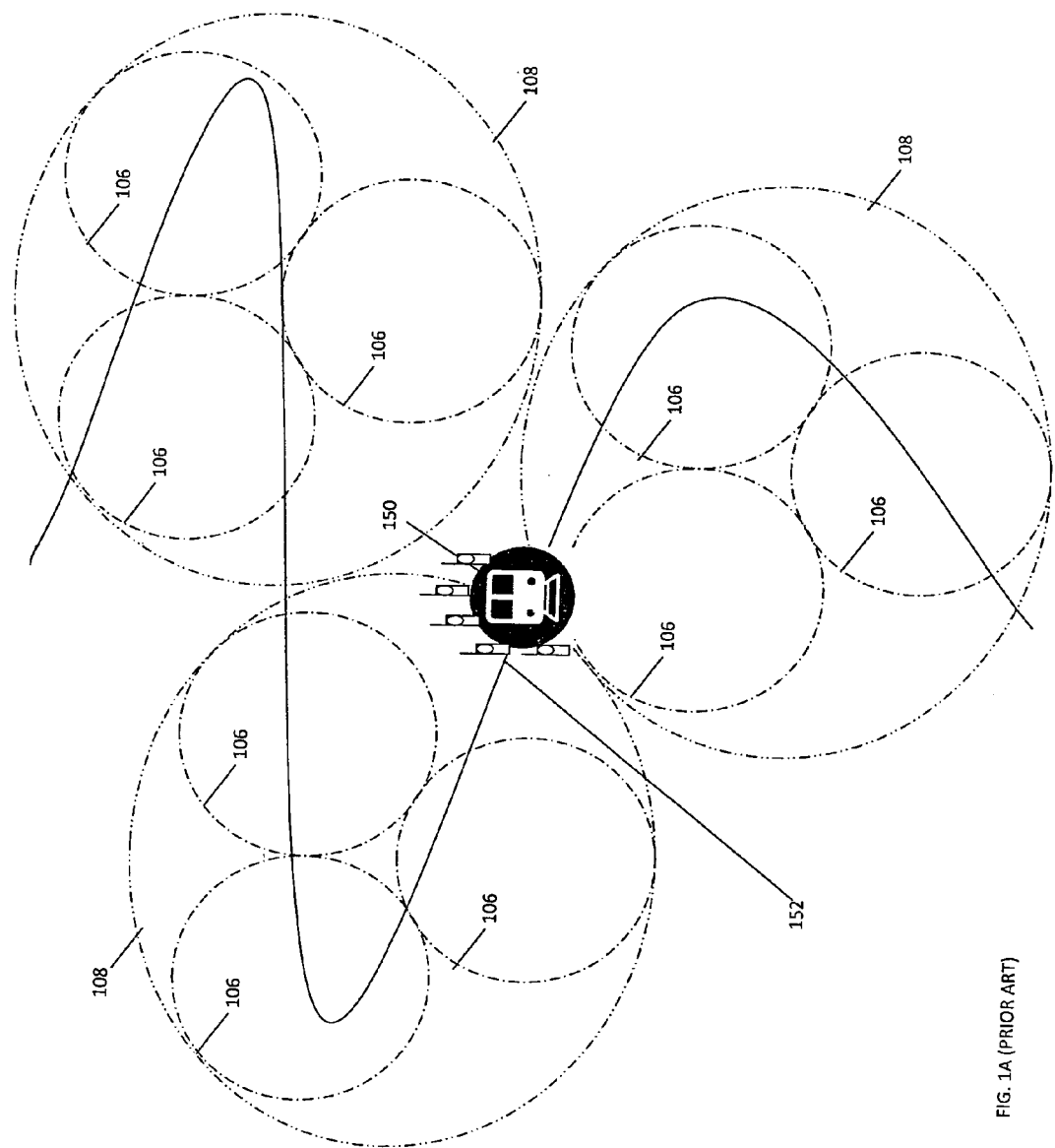
FIG. 1A illustrates an exemplary platform (passenger train) with a large UE spatial density crossing an LA/RA boundary within the UMTS system of FIG. 1.
Figure 2:
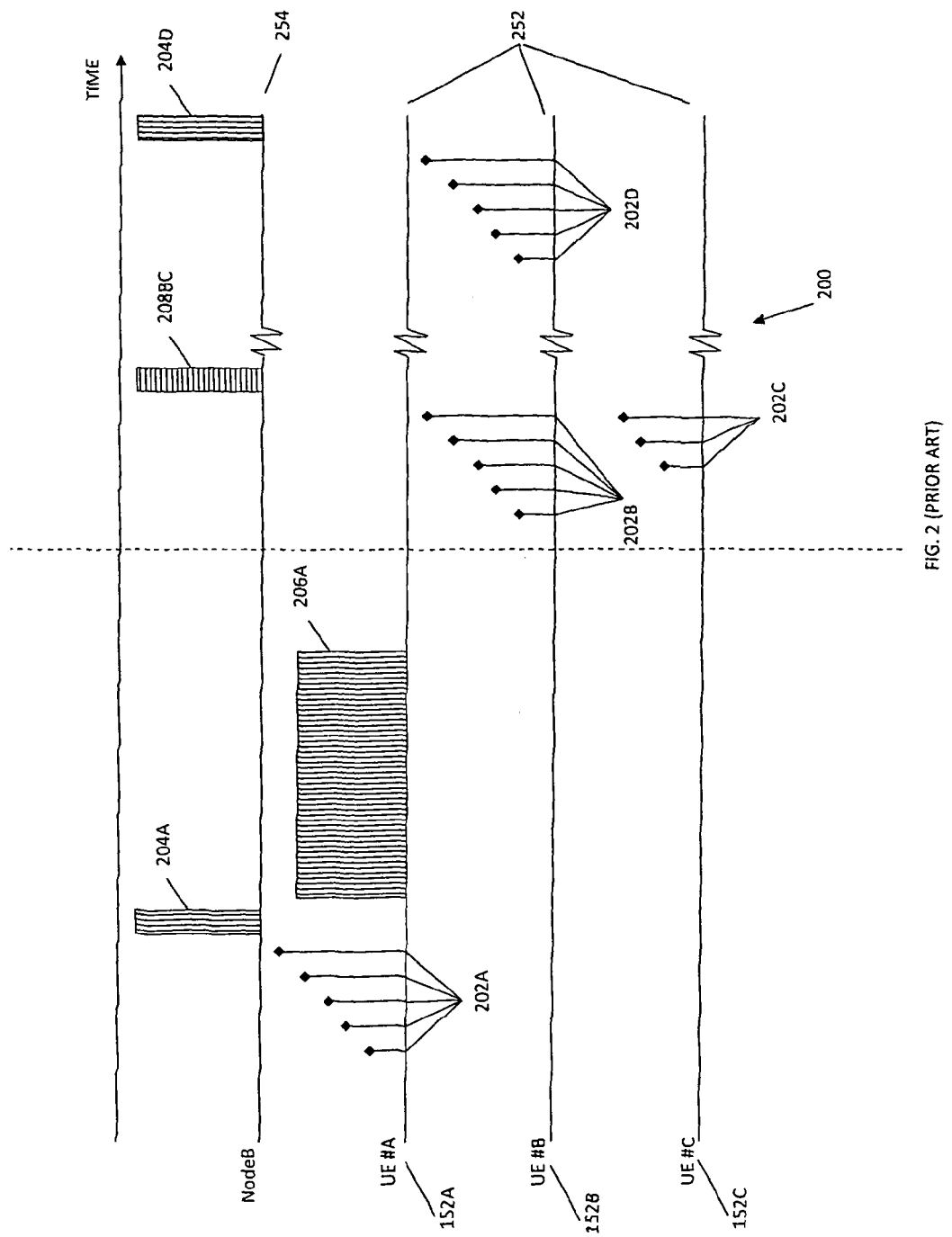
FIG. 2 is a graphical representation illustrating a portion of the establishment of a radio link in the exemplary UMTS cellular system of FIG. 1.
Figure 2A:
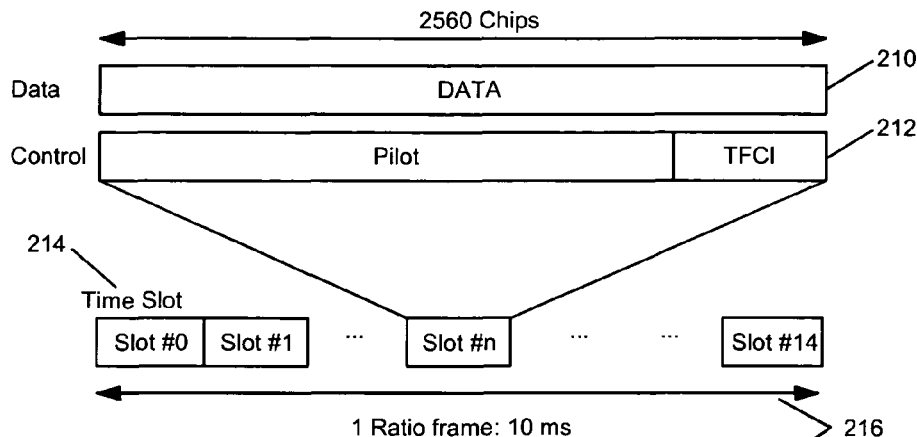
FIG. 2A illustrates an exemplary format of the prior art UMTS Random Access Channel (RACH).
Figure 2B:
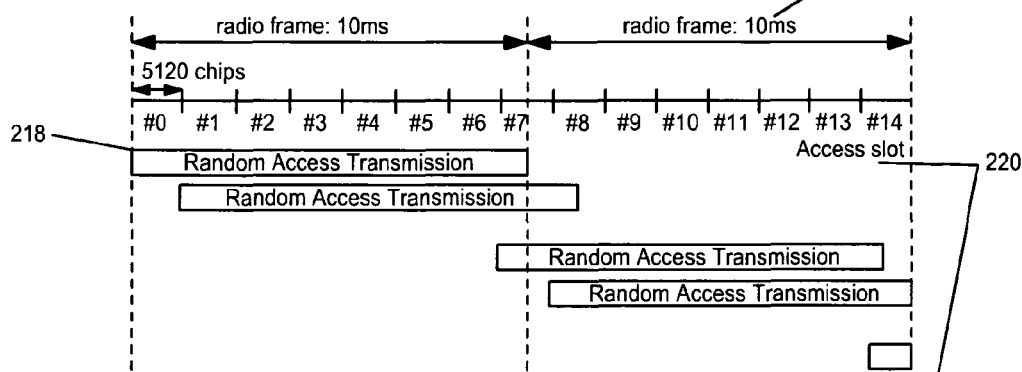
FIG. 2B illustrates random access timing of the Random Access Channel (RACH) of FIG. 2A.
Figure 2C:
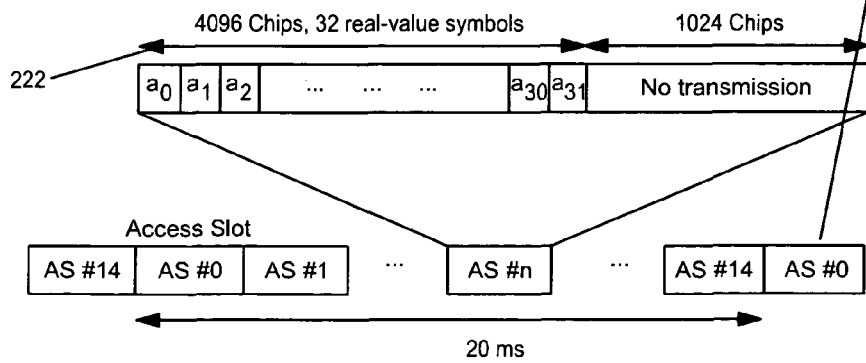
FIG. 2C illustrates an exemplary format of the prior art UMTS Acquisition Indicator Channel (AICH).

One exemplary illustration of the foregoing method 500 is now described. Consider the case where a UMTS relay station 112 is located on a passenger train 150 (FIG. 1A), and is aware that several thousand UEs 152 are in idle mode on the train. Detection is accomplished by the UMTS relay station by monitoring RACH traffic. The monitoring of RACH traffic may be constant, periodic, or alternatively event-driven (e.g., is activated as the train approaches a known LA/RA boundary).

Initially, as shown in FIG. 5A, the relay station 112 amplifies the radio signals of all NodeBs 102 and UEs 152 that are within range of the relay station. The range 104 of the NodeB encompasses the relay station, but does not encompass the UEs. The range 540 of the relay station encompasses the NodeB and the UEs. The range 550 of the UEs encompasses the relay station but does not reach the NodeB.

In the downlink direction, the relay station 112 minimally intercepts and processes the channels comprising the CPICH, and AICH 254. In the uplink direction, the NodeB relay station minimally intercepts and processes the channel comprising the PRACH 252. In standard operation, a relay station will repeat all transmissions (e.g. dedicated data, dedicated control, shared control, paging and synchronization channels, etc.), enabling increased wireless coverage for voice, SMS and data applications.

The UEs 152 calculate the initial transmit power of the PRACH 252 with the signal strength of the NodeBs 102 CPICH. It is assumed that the transmission power of UEs is set at a low level because the CPICH is amplified by the relay station, and the received signal strength at the UE is excellent.

Figure 3:
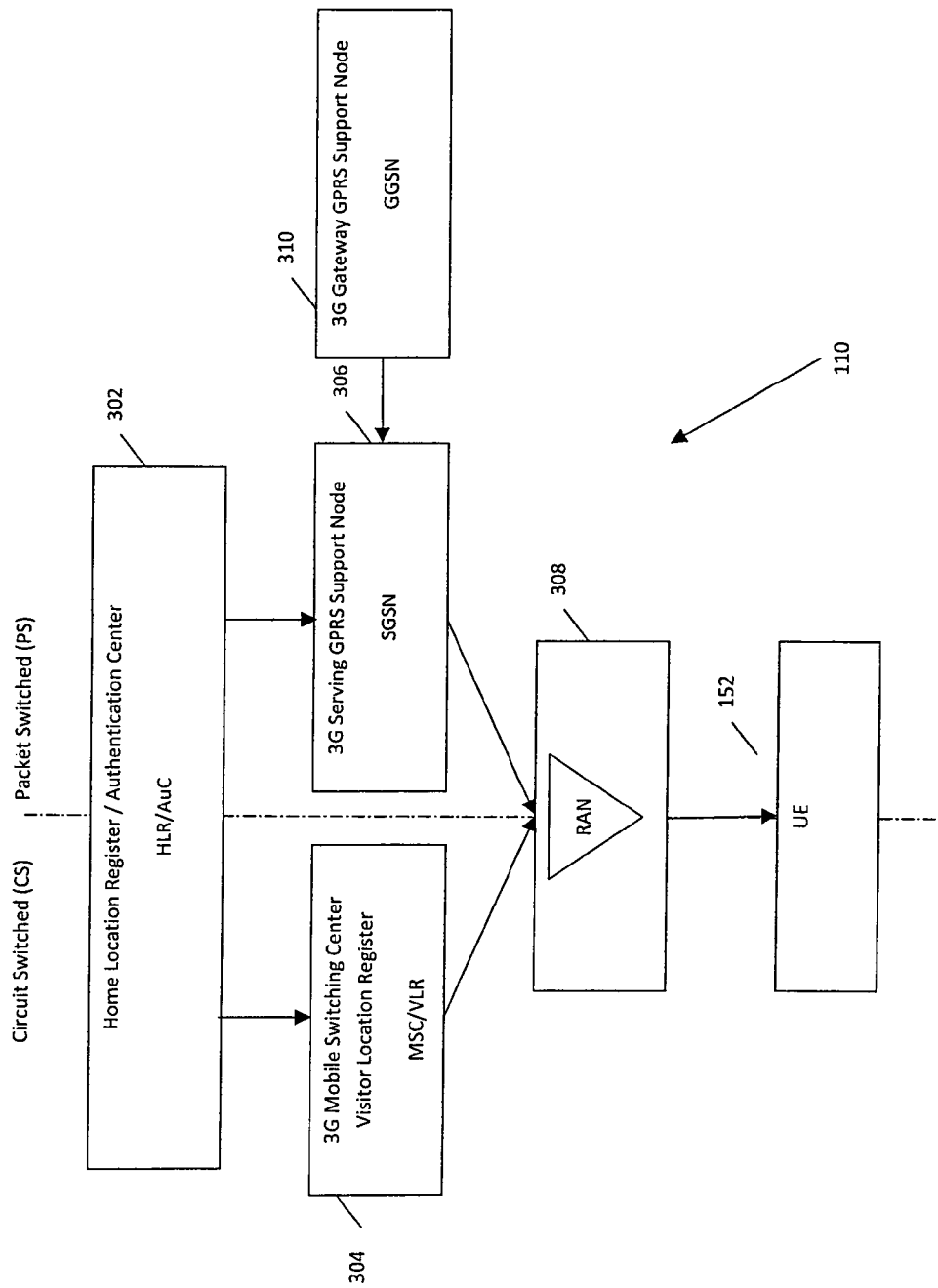
FIG. 3 is a functional block diagram illustrating the entities involved in a prior art UMTS LA/RA update process.
Figure 3A:
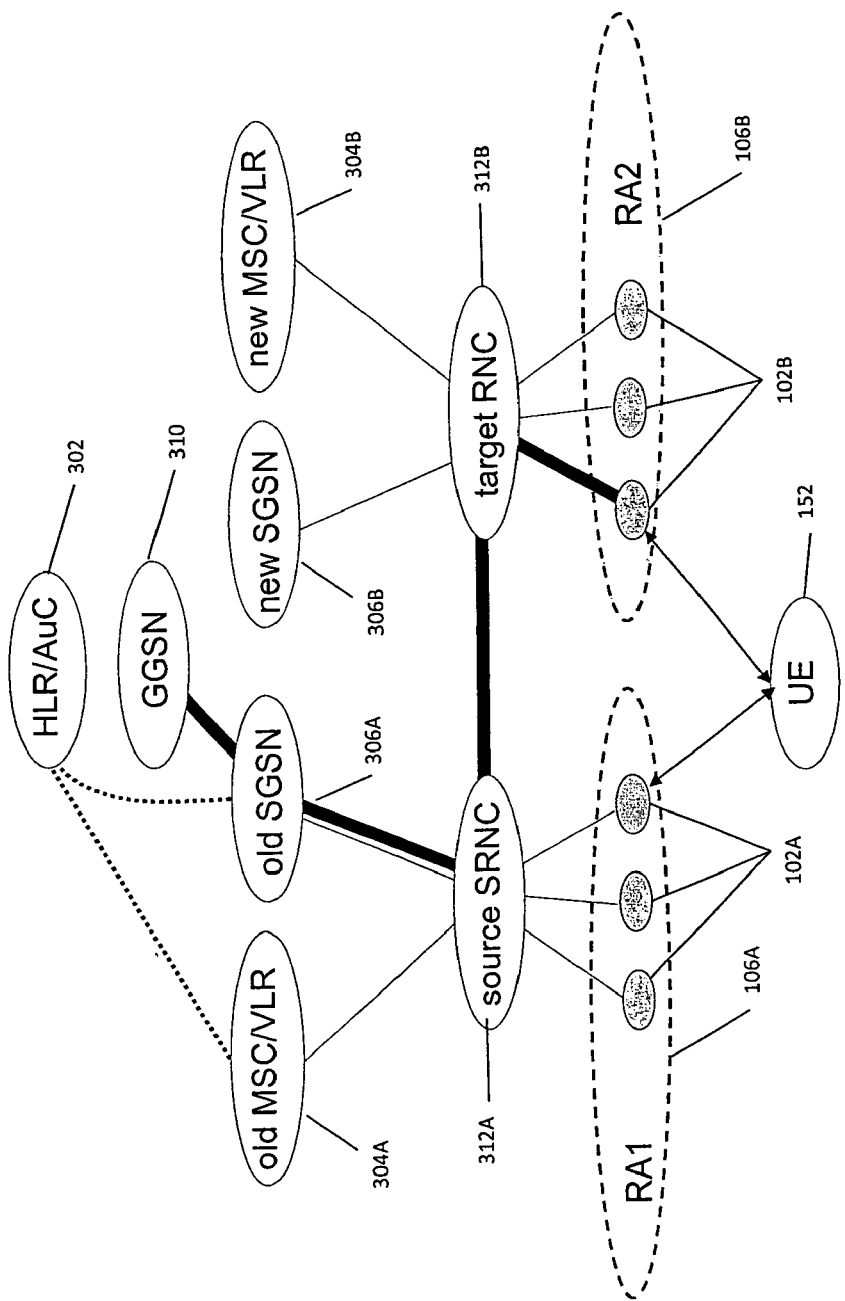
FIG. 3A is a functional block diagram showing the various entities involved in a prior art UMTS RA update process.
Figure 3B:
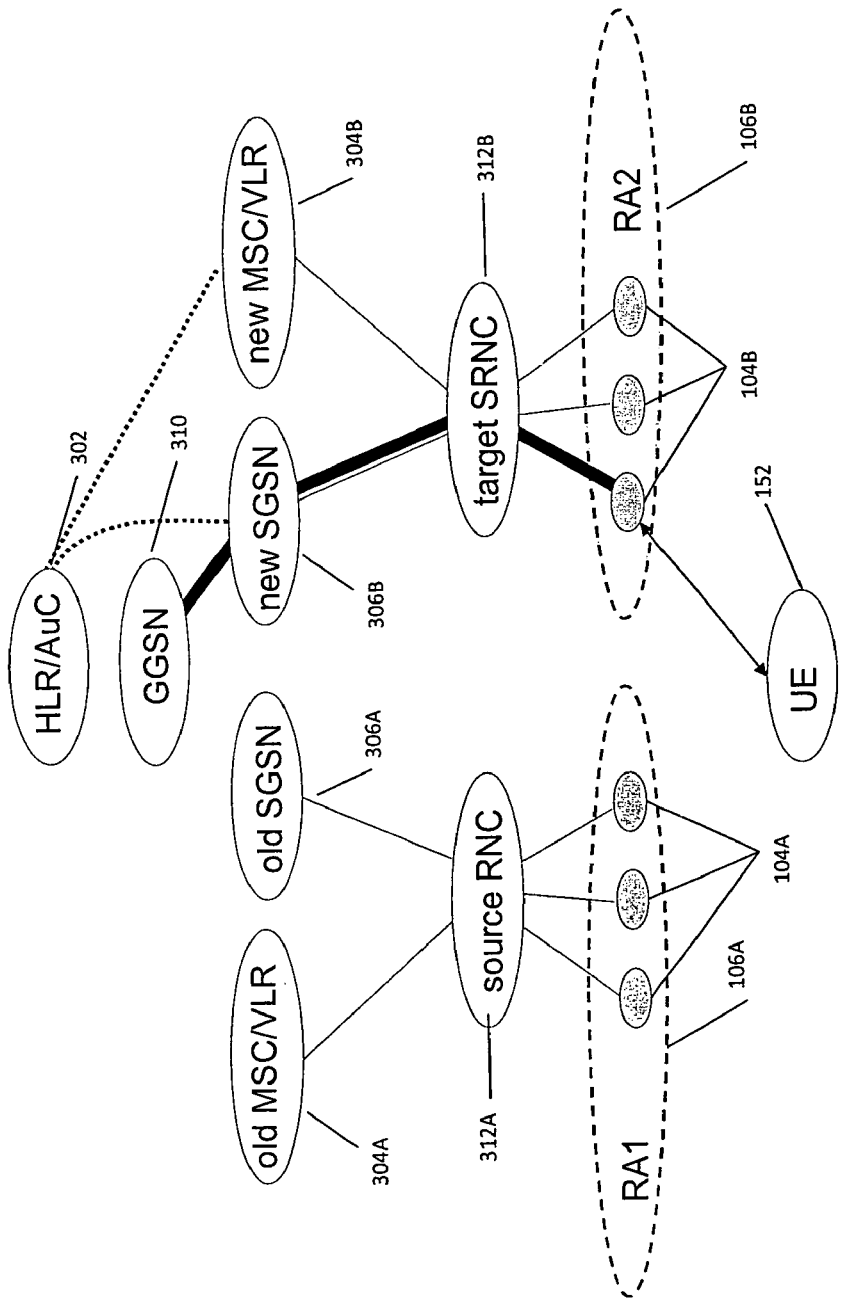
FIG. 3B illustrates the system of FIG. 3A subsequent to an RA update by the UE.
Figure 4A:
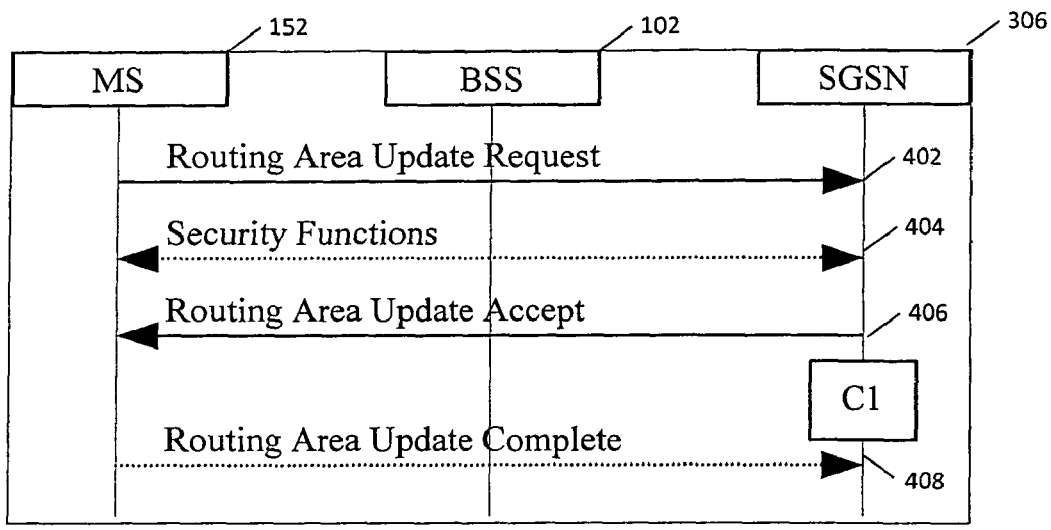
FIG. 4A is a graphical representation of an exemplary Intra-SGSN RA update procedure for UMTS systems such as that shown in FIG. 1.
Figure 4B:
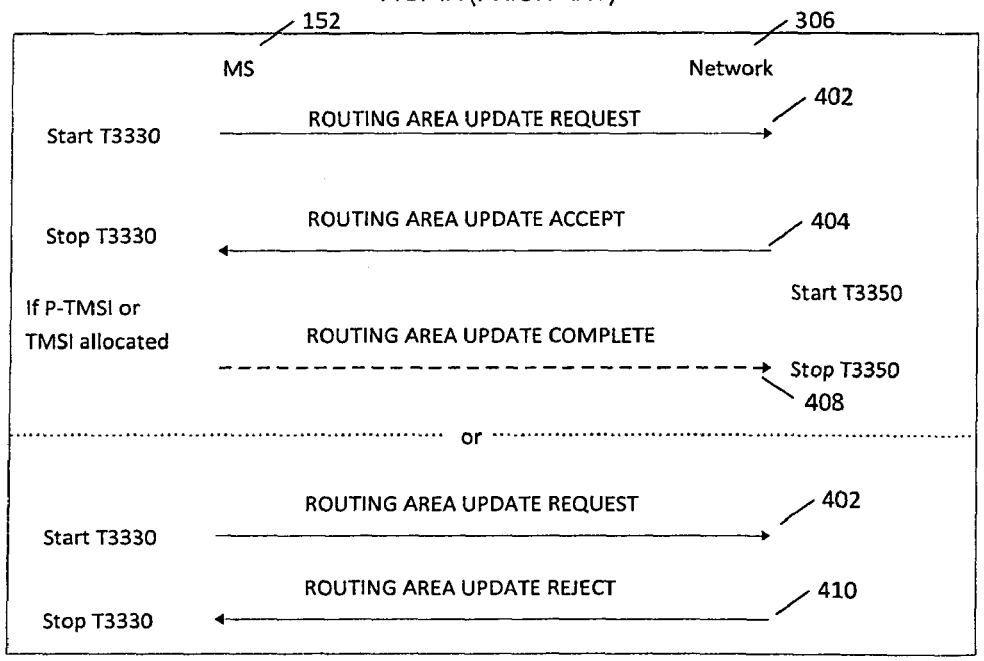
FIG. 4B is a graphical representation of an exemplary prior art RA updating procedure with timers.

The UEs 152 detect the presence of a new NodeB 102B, via a relay station 112. The UE reads the system information originating at the new NodeB, and determines that the new NodeB belongs to the same PLMN but has a different RAC than the existing NodeB 102A with which they are communicating. The UE performs measurements of the received signal strength (e.g. measurement of CPICH signal power); because the received signal is being repeated at the relay station, the received signal power is very high. The received signal strength is high enough to cause the UEs to perform a cell update (the simultaneous measurement of the new NodeB 102B and the old NodeB 102A is shown at a logical level in FIG. 3A).

If the UEs have an active data connection, they may also perform a routing area update using the existing connection to optimize the data routing.

If the UEs 152 are in idle mode, and do not have an active data connection, then the UEs each attempt to initialize an RRC connection request on the PRACH 252. The UEs calculate the initial PRACH preamble transmission power based on the received CPICH signal strength of the new cell (via the relay station). Based on the access service class stored in the Subscriber Identity Module (SIM), the UEs choose a time slot out of a set of available time slots, and a signature out of a set of orthogonal signatures. The UEs send, at the chosen time slot, a fixed preamble coded with the chosen signature.

The large number of UEs requesting an RRC connection as described above (or other triggering criterion) triggers the relay station 112 operation. Once the trigger event has been detected by the relay station, the relay station 112 switches to an LA update/RA update prevention mode. This mode is active for e.g., a specified time period, which is established as a result of historical behaviors associated with user behavior, platform (e.g., train) scheduling, time of day, etc.

Figure 6:
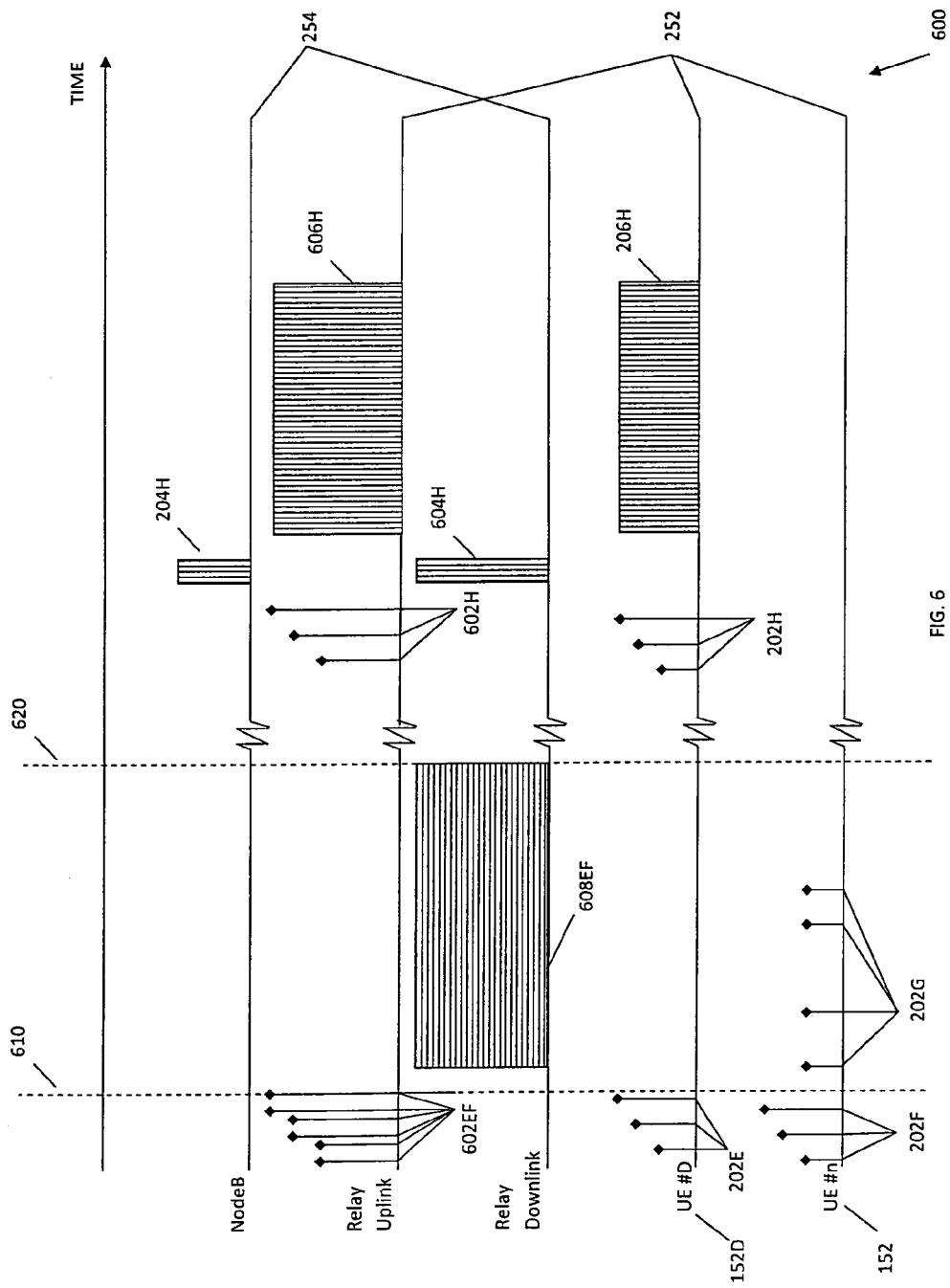
FIG. 6 is a graphical representation of an exemplary implementation of the generalized intelligent relay procedure of FIG. 5, shown in the context of a UMTS (3G) cellular system.

In FIG. 6 (a signal-based representation 600 of the plurality of UEs 152), the operation of the relay station 112 and the NodeB 102 in the aforementioned LA update/RA update prevention mode is shown. The plurality of UEs transmits preambles 202E, 202F, where UE#D is one UE 152D out of the plurality of UEs (collectively represented by UE#n). The relay station forwards on its uplink path, the corresponding repeated uplink preambles 602EF. At time 610, the relay station determines that a congestive event has occurred, and switches to RA update prevention mode.

The relay station 112 operating in RA update prevention mode does not amplify further RACH preambles 202G. Furthermore, the relay station generates a preemptive NACK 608EF message on the Acquisition Indicator Channel (AICH) in all or a portion of all time slots. The UEs 152 receive the preemptive NACK message and halt the RRC connection requests for an extended period of time.

At a later point 620, the relay station 112 has detected that the plurality of UEs 152 is no longer requesting PRACH 252 access (lull in activity indicates decongestion). The relay station stops sending the NACK 608EF on the AICH 254.

The relay station 112 recommences relay operation. The staggered RRC connection requests and the following RA updates are handled by the NodeB 102 as usual. UE#D 152D sends a PRACH preamble 202H, which is amplified by the relay station 602H. The NodeB sends a corresponding ACK 204H, which is amplified by the relay station 604H. UE#1 initiates a RACH 206H RRC connection and begins uplink transmission, which is amplified by the relay station to be 606H.

Exemplary Relay Station Apparatus

Figure 7:
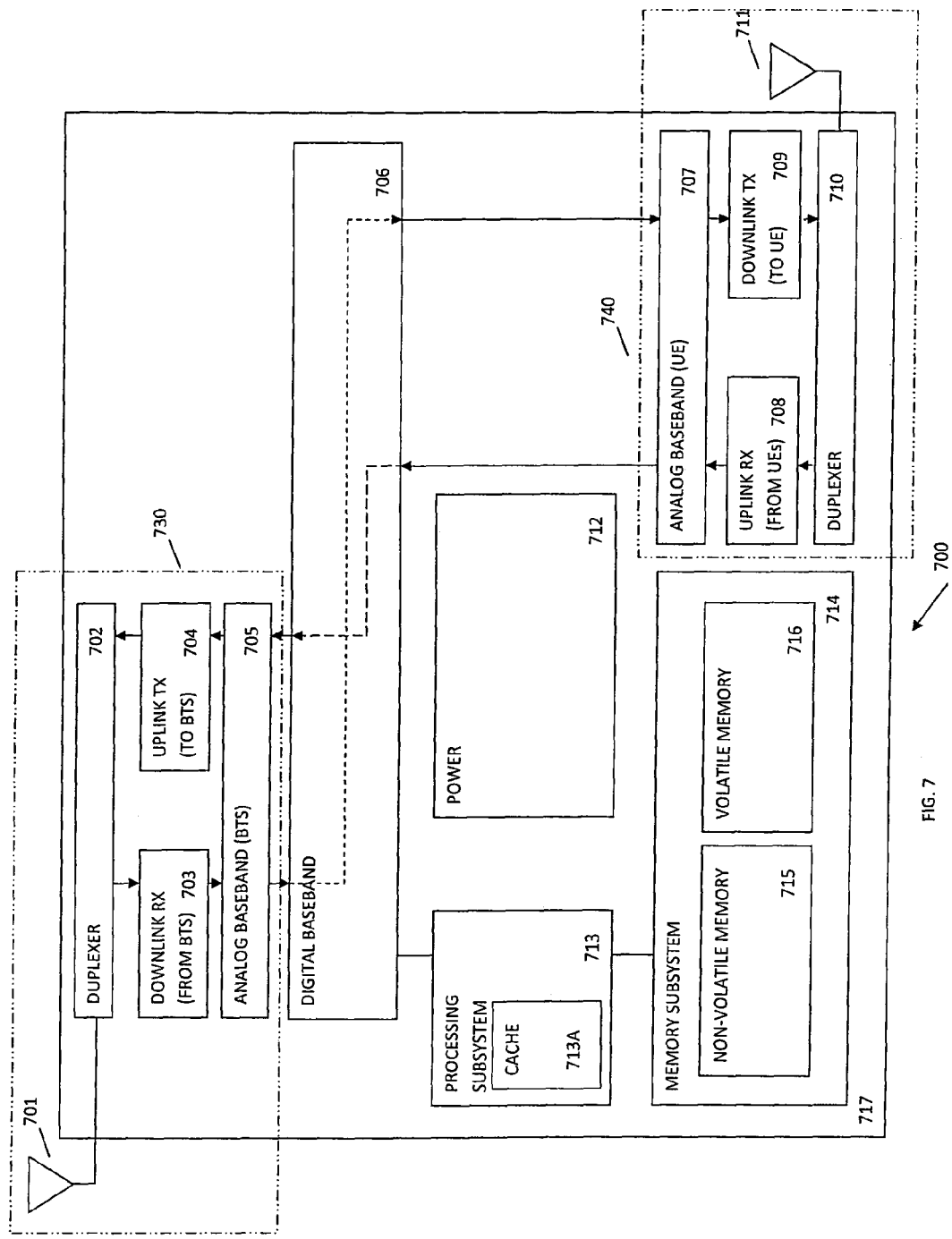
FIG. 7 is a block diagram illustrating one embodiment of the relay station apparatus according to the present invention.

Referring now to FIG. 7, exemplary apparatus 700 useful in implementing the methodologies of the present invention is illustrated. The apparatus 700 may for instance comprise a repeater or relay station 112 or other radio frequency apparatus present within a wireless (e.g. cellular) network infrastructure.

The illustrated embodiment of the apparatus 700 is adapted for use within a 3G (UMTS) network, and comprises one or more substrate(s) 717 that further include a plurality of integrated circuits and electrical components. The components within the apparatus 700 are powered via a power management subsystem 712. The apparatus 700 also comprises a processor subsystem 713 such as a digital signal processor, microprocessor, gate array, or plurality of processing components. The processing subsystem might also comprise an internal cache memory 713A. The processing subsystem is in data communication with a memory subsystem 714 comprising non-volatile memory 715, and volatile memory 716. Computer programs necessary for implementing the aforementioned methodologies are preferably stored onboard the apparatus in memory 714 or on a mass storage device (e.g., HDD).

A Base Transceiver Station (BTS) RF transceiver subsystem and antenna assembly 730 of the apparatus 700, for communicating with the NodeB, comprises an Analog Baseband 705, RF components for RX 703 and TX 704, an associated duplexer 702, as well as an antenna 701. In some embodiments, not all components may be present, or may be merged with one another as is well understood in the electronic arts.

A UE RF transceiver subsystem and antenna assembly 740, for communicating with a plurality of UEs, comprises an Analog Baseband 707, RF components for RX 708 and TX 709, an associated duplexer 710, and an antenna 711.

The two separate RF front ends are preferably electrically isolated (and electromagnetically isolated, i.e., via sufficient db isolation between the various antenna elements 711, 730) from one another for a repeating relay system. The transmitter and receiver are on at the same time and use the same frequency bands for both BTS and UE interfaces. If the relay station's transmitter and receiver are not isolated well, the relay station's own transmitter may interfere with its receiver. More specifically, the receive downlink RX 703 would be interfered with by the downlink TX 709, if the downlink TX is not sufficiently isolated from the downlink RX. Correspondingly, the uplink RX 708 requires equivalent isolation from the uplink TX 704.

Business/Operational Rules Engine

In another aspect of the invention, a business or operational rules engine related to the congestion management and avoidance apparatus and techniques described herein is provided.

This engine comprises, in an exemplary embodiment, a series of software routines or other associated hardware/firmware environment adapted to control the operation of the congestion management and avoidance algorithms previously described. These rules may also be fully integrated within the relay or repeater apparatus 700 itself or Mobility Management Entity (MME) of the SGSN, and configured and controlled via e.g., a GUI on a PC connected to or indigenous with the apparatus. In effect, the rules engine comprises a supervisory entity that monitors and selectively controls the congestion management and avoidance functions at a higher level, so as to implement desired operational or business rules. The rules engine can be considered an overlay of sorts to the basic congestion management/avoidance algorithms of the relay station 112. For example, the relay station 112 or MME may invoke certain operational protocols or decision processes based on the aforementioned congestion avoidance algorithms. However, these processes may not always be compatible with higher-level business or operational goals, such as maximizing profit or subscriber satisfaction and experience. Hence, when imposed, the business/operational rules can be used to dynamically (or manually) control the operation of the relay station 112. The rules may be, e.g., operational or business-oriented in nature, and may also be applied selectively in terms of time of day, duration, specific local areas, or even at the individual user level.

For example, one rule implemented by the rules engine may comprise whether to operate a given relay station 112 or set of stations during certain times of the day and/or days of the week. For example, in one variant, the relay station could be switched on during high-traffic periods only (e.g., rush hour), since congestion may potentially occur only during such periods and the marginal utility (benefit per unit cost) to the network operator of operating the station(s) during other times may be low.

As another example, the "blocking" of UEs (i.e., NACKing of UEs who issue requests for updates) is performed selectively based on one or more attributes of the UE.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a cellular communication system so as to avoid simultaneously receiving an excessive number of requests for a service on a first channel, comprising:
    sending a message on a second channel,
        where said message results in a staggering of said requests by a randomized period of time;
        where the staggering of said requests is completed via a relay station; and
    wherein said relay station causes said staggering of said requests for service on a first channel whenever the number of said requests exceeds a prescribed threshold value.

2. The method of claim 1, wherein said cellular system comprises a third generation (3G) system, said first channel comprises a Random Access Channel (RACH), said second channel comprises an Acquisition Indicator Channel (AICH), and said excessive number of requests are triggered by the substantially simultaneous crossing of a geographic boundary by a plurality of users of said 3G system.

3. The method of claim 1, wherein said message sent on said second channel is indicative of a collision between two or more of said requests when in fact such requests had no such collision.

4. A computer readable apparatus comprising a storage medium storing at least one computer program, the at least one program comprising a plurality of instructions which, when executed by a processing device:
    monitor an access channel of a wireless network to determine a number of wireless devices that intend to issue an access request message; and
    send a plurality of response messages on a synchronization channel of the wireless network at least when the number of wireless devices that intend to issue an access request message exceeds a threshold value;
    wherein the plurality of response messages impose a multiple access scheme on subsequent access request messages from the wireless devices;
    wherein said multiple access scheme is configured to stagger said access request messages; and
    wherein the staggered access requests are completed via a relay station.

5. The computer readable apparatus of claim 4, wherein the threshold value corresponds to a level of network congestion value that would substantially degrade the operation of the wireless network.

6. The computer readable apparatus of claim 5, wherein the computer readable apparatus comprises a storage device of a relay station within the wireless network.

7. The computer readable apparatus of claim 6, wherein the network comprises a third generation (3G) cellular network, the access channel comprises a Random Access Channel (RACH), the synchronization channel comprises an Acquisition Indication Channel (AICH), and the monitoring of the access channel comprises monitoring for Radio Resource Connection (RRC) or Location Area/Routing Area (LA/RA) update requests from the wireless devices.

8. The computer readable apparatus of claim 6, wherein the apparatus is configured to disable uplink and/or downlink communications at the relay station when the number of wireless devices that intend to issue an access request message exceeds a threshold value.

9. A base station apparatus for use within a cellular communication system, the base station apparatus configured to avoid simultaneously receiving an excessive number of requests for a service on a first channel, the apparatus comprising:
    processor apparatus;
    at least one wireless interface in data communication with the processor apparatus; and
    computerized logic in data communication with the processor apparatus, the logic configured to send a message on a second channel, said message resulting in a staggering of said requests by a randomized period of time;

wherein:

the staggering of said requests is performed at least in part via a relay station; and said relay station causes said staggering of said requests for service on a first channel whenever the number of said requests exceeds a prescribed threshold value.

10. The base station apparatus of claim 9, wherein said cellular communication system comprises a third generation (3G) system, said first channel comprises a Random Access Channel (RACH) channel, said second channel comprises an Acquisition Indicator Channel (AICH) channel, and said excessive number of requests are triggered by the substantially simultaneous crossing of a geographic boundary by a plurality of users of said 3G system.

11. The base station apparatus of claim 9, wherein said message sent on said second channel is indicative of a collision between two or more of said requests when in fact such requests had no such collision.

12. A method of operating a wireless network, comprising:

monitoring an access channel of the wireless network to determine a number of wireless devices that intend to issue an access request message; and sending a plurality of response messages on a synchronization channel of the wireless network at least when the number of wireless devices that intend to issue an access request message exceeds at least one specified criterion;

wherein:

the plurality of response messages caused imposition of a multiple access scheme on subsequent access request messages from the wireless devices; and the multiple access scheme is configured to stagger said access request messages, the staggered access requests being performed at least in part using a relay station.

13. The method of claim 12, wherein the at least one criterion relates at least in part to a level of network congestion that would substantially degrade the operation of the wireless network.

14. The method of claim 13, wherein the network comprises a third generation (3G) cellular network, the access channel comprises a Random Access Channel (RACH).

15. The method of claim 13, wherein the synchronization channel comprises an Acquisition Indication Channel (AICH), and the monitoring of the access channel comprises monitoring for Radio Resource Connection (RRC) or Location Area/Routing Area (LA/RA) update requests from the wireless devices.

16. The method of claim 13, wherein the apparatus is configured to cause disabling of uplink and/or downlink communications at the relay station when the number of wireless devices that intend to issue an access request message exceeds at least one second criterion.

17. A base station apparatus for use within a cellular communication system, the base station apparatus configured to manage simultaneous receipt of a number of requests for a service on a first channel, the apparatus comprising:

processor means;

at least one means for wireless communication in data communication with the processor means; and computerized logic in data communication with the processor apparatus, the logic configured to send a message on a second channel, said message resulting in a staggering of said requests according to a prescribed staggering scheme;

wherein the staggering scheme is implemented at least in part via a network relay means whenever the number of said requests meets or exceeds a prescribed criterion.

* * * * *